United States Patent
Itoh

(10) Patent No.: US 6,746,123 B2
(45) Date of Patent: Jun. 8, 2004

(54) PROJECTOR FOR PREVENTING LIGHT LOSS

(75) Inventor: Yoshitaka Itoh, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/309,164

(22) Filed: Dec. 4, 2002

(65) Prior Publication Data

US 2003/0095236 A1 May 22, 2003

Related U.S. Application Data

(63) Continuation of application No. 09/487,806, filed on Jan. 20, 2000, now Pat. No. 6,497,485, which is a continuation-in-part of application No. 09/011,097, filed on Jan. 27, 1998, now Pat. No. 6,036,318.

(30) Foreign Application Priority Data

May 29, 1996 (JP) .............................. 8-135587

(51) Int. Cl.[7] ....................... G02B 21/14; G02B 21/00; G02B 21/26; G02B 21/28; G02F 1/1335
(52) U.S. Cl. ............................ 353/20; 353/31; 353/37; 353/38; 353/81; 353/102; 349/5; 349/9
(58) Field of Search ............................ 353/20, 30, 31, 353/34, 37, 38, 81, 102; 349/5, 9; 359/622

(56) References Cited

U.S. PATENT DOCUMENTS

| 5,098,184 A | 3/1992 | Van Den Brandt et al. . 353/102 |
| 5,601,351 A | 2/1997 | Van Den Brandt ........... 353/20 |
| 5,815,221 A | 9/1998 | Kojima et al. .............. 348/751 |
| 5,826,959 A | 10/1998 | Atsuchi ........................ 353/20 |
| 5,865,521 A | 2/1999 | Hashizume et al. .......... 353/38 |
| 5,898,521 A | 4/1999 | Okada ........................ 359/487 |

(List continued on next page.)

FOREIGN PATENT DOCUMENTS

| JP | A 1-265206 | 10/1989 | ............. G02B/5/30 |
| JP | 3-63690 A | 3/1991 | ............. G09F/9/00 |
| JP | 3-187696 A | 8/1991 | ............. H04N/9/31 |
| JP | 3-243912 A | 10/1991 | ........... G02B/27/28 |
| JP | 4-58242 A | 2/1992 | ........... G03B/33/12 |
| JP | 04-310903 | 2/1992 | ........... G02B/5/30 |
| JP | A 4-194921 | 7/1992 | ........... G03B/33/12 |
| JP | 5-80321 | 4/1993 | ......... G02F/1/1335 |
| JP | 5-181135 | 7/1993 | ......... G02F/1/1335 |
| JP | 6-3510 | 1/1994 | ............. G02B/5/06 |
| JP | 06-094902 | 8/1994 | ............. G02B/3/00 |

(List continued on next page.)

OTHER PUBLICATIONS

[Development Design] Optical Device, Liquid Crystal, "Matsushita Industrial Co., Ltd. Develops Liquid Crystal Projector with Doubled Brightness: Polarized light converting optical system formed with a simpler structure for installation." Nikkei Mechanical, Jan. 6, 1997, No. 497, pp. 18–19.

Primary Examiner—Russell Adams
Assistant Examiner—Melissa J Koval
(74) Attorney, Agent, or Firm—Oliff & Berridge, PLC

(57) ABSTRACT

A projector 1 is mainly composed of a polarized light beam illumination device, a collimating lens 170a, polarized beam splitter, a reflection-type liquid crystal device, and a projection optical system. The polarized light beam illumination device includes a light source, a first optical element, and a second optical element. Light emitted from the light source is divided into a plurality of intermediate light beams by the first optical element, and then converted into polarized light beams having substantially one polarization direction by the second optical element. The polarized light beams enter the collimating lens, are transmitted by the polarized beam splitter, modulated by the reflection-type liquid crystal device, reflected by the polarized beam splitter, and then projected on a projection plane via the projection optical system.

18 Claims, 12 Drawing Sheets

U.S. PATENT DOCUMENTS

| | | | |
|---|---|---|---|
| 5,944,401 A * | 8/1999 | Murakami et al. | 353/33 |
| 6,022,110 A | 2/2000 | Tsujikawa | 353/20 |
| 6,028,703 A | 2/2000 | Sekine et al. | 359/487 |
| 6,067,193 A | 5/2000 | Sekine et al. | 359/489 |
| 6,179,425 B1 | 1/2001 | De Vaan | 353/38 |
| 6,183,090 B1 | 2/2001 | Nakanishi et al. | 353/20 |
| 6,217,173 B1 | 4/2001 | Huang et al. | 353/20 |
| 6,273,567 B1 * | 8/2001 | Conner et al. | 353/20 |
| 6,327,093 B1 | 12/2001 | Nakanishi et al. | 359/634 |
| 6,331,060 B1 | 12/2001 | Yamamoto et al. | 353/31 |
| 6,379,010 B1 * | 4/2002 | Suzuki et al. | 353/31 |
| 6,497,485 B1 * | 12/2002 | Itoh | 353/20 |
| 6,529,250 B1 * | 3/2003 | Murakami et al. | 349/5 |
| 2001/0021004 A1 | 9/2001 | Yano | 353/31 |

FOREIGN PATENT DOCUMENTS

| | | | |
|---|---|---|---|
| JP | 6-242463 | 9/1994 | G02F/1/1347 |
| JP | 7-209621 | 8/1995 | G02F/1/13 |
| JP | 7-294851 | 11/1995 | G02B/27/28 |
| JP | 7-318861 | 12/1995 | G02B/27/28 |
| JP | A8-234205 | 9/1996 | G02F/1/1335 |
| JP | 10-10467 | 1/1998 | G02B/27/18 |
| JP | 10-170869 | 6/1998 | G02B/27/28 |
| JP | U 63-159022 | 10/1998 | G02F/1/13 |
| JP | 11-30712 | 2/1999 | G02B/5/20 |
| JP | 11-64850 | 5/1999 | G02F/1/1335 |
| JP | 11-231264 | 8/1999 | G02B/27/28 |
| JP | 11-239359 | 8/1999 | H04N/9/31 |
| JP | 2000-284361 | 10/2000 | G03B/21/00 |

* cited by examiner

PROJECTOR FOR PREVENTING LIGHT LOSS

BACKGROUND OF THE INVENTION

1. Field of Invention

The present invention relates to a projector for projecting and displaying a display image formed by a reflection-type modulation device, such as a reflection-type liquid crystal device, on a projection plane.

2. Description of Related Art

Nowadays, a projector using a transmissive liquid crystal device as a light valve is well known as a method for displaying a large screen image. As an example of such a projector, a typical construction of a projector using three transmissive liquid crystal devices is shown in FIG. 12.

A light source 110 is composed of a light source lamp 111 and a paraboloidal reflector 112, and light emitted from the light source lamp 111 is reflected by the paraboloidal reflector 112 to enter a dichroic mirror 401. The light is separated into red light, green light, and blue light by two dichroic mirrors 401 and 402, each having wavelength-selectivity, and then illuminates transmissive liquid crystal devices 301R, 301G, and 301B corresponding to each color light. The light transmitted by each of the transmissive liquid crystal devices is synthesized by a cross-dichroic prism 420, and is projected and displayed on a projection plane 600 via a projection optical system 500. Reflecting mirrors 403, 404, and 405 for reflecting light beams are provided on an optical path of the red light and an optical path of the blue light.

In the cross-dichroic prism 420 used as a color-light-synthesizing unit, dichroic films are arranged in the form of an X. The color-light-synthesizing unit of the projector using three liquid crystal devices can be realized by arranging two cross-dichroic mirrors in parallel with each other instead of the cross-dichroic prism 420. The use of the cross-dichroic prism 420, however, is characterized by providing a bright projected image without using a large-aperture projection lens because the distance between the liquid crystal devices 301R, 301G, and 301B and the projection optical system 500 can be shortened as compared with a case where the two dichroic mirrors are arranged in parallel with each other.

In the conventional projector, however, while the optical path can be shortened by the use of the cross-dichroic prism 420 in a color-light-synchronization portion, the length of the optical path is considerably long in a color-light-separation portion because the dichroic mirrors 401 and 402, and the reflecting mirrors 403, 404, and 405 are used. Therefore, in the conventional projector, the light loss in a light separating process is large, and characteristics of the cross-dichroic prism 420 cannot be sufficiently utilized.

A light beam emitted from the light source 110 composed of the light source lamp 111 and the paraboloidal reflector 112 has a non-uniform light intensity distribution in a cross section of the light beam, and has characteristics such that the light intensity of illumination light near an optical axis of the light source is high, and the light intensity of the illumination light decreases with distance from the optical axis. Therefore, in the conventional projector shown in FIG. 12, the light intensity of the illumination light is non-uniformly distributed on the liquid crystal devices 301R, 301G, and 301B, which are areas to be illuminated, and non-uniform brightness or color shading occurs in an image projected on the projection plane 600.

Furthermore, when the brightness of the projected image is to be considerably increased using a light source lamp having extremely high optical output, light absorption is large in the liquid crystal devices of the conventional projector using the transmissive liquid crystal devices, and a large-scale cooling device for cooling the liquid crystal devices is absolutely required.

SUMMARY OF THE INVENTION

It is an object of the present invention to provide a projector capable of obtaining a bright projected image without using a large-aperture projection lens by shortening the length of an optical path to prevent the loss of light.

In addition, it is an object to provide a projector which reduces non-uniformity of light intensity distribution of illumination light in an area to be illuminated, and which provides uniform brightness and excellent image quality.

Furthermore, it is an object to provide a projector which does not require a large-scale cooling device even if a light source lamp having extremely high optical output is used.

A first projector of the present invention may consist of: a light source, a first optical element for condensing a light beam from the light source and dividing the light beam into a plurality of intermediate light beams, a second optical element placed on the light-emitting side of the first optical element for converting the plurality of intermediate light beams into one type of polarized light beams and superimposing the polarized light beams on a reflection-type modulation device, only one reflection-type modulation device for modulating light emitted from the second optical element, a polarized light beam selection element placed on an optical path between the second optical element and the reflection-type modulation device for reflecting or transmitting the light emitted from the second optical element to allow the light to reach the reflection-type modulation device and for transmitting or reflecting the light modulated by the reflection-type modulation device to allow the light to reach a projection optical system, and a collimating lens placed between the second optical element and the polarized light beam selection element.

According to the above construction of the first projector of the present invention, the length of the optical path can be extremely shortened, and the loss of light can be minimized. Therefore, it is possible to obtain an extremely bright projected image without using a large-aperture projection lens.

As the first optical element, a lens array having, for example, a plurality of light beam-dividing lenses arranged in a matrix may be used. By dividing the light beam from the light source into a plurality of intermediate light beams with such a lens array, and by superimposing the intermediate light beams on an area to be illuminated, non-uniform luminance can be further reduced than that of a single light beam. Therefore, even if the light beam emitted from the light source has a non-uniform light intensity distribution within a cross section of the light beam, illumination light having uniform brightness can be obtained. In particular, when the light intensity distribution of the light beam is not random, but the light intensity distribution has a fixed tendency as seen in a light beam emitted from a light source composed of a light source lamp and a paraboloidal reflector, the use of the above first optical element can make the light intensity distribution and angular distribution of the illumination light on the area to be illuminated extremely uniform.

The second optical element separates each of the intermediate light beams into a p-polarized light beam and an s-polarized light beam, aligns the polarization direction, and finally superimposes the light beams on a single area to be illuminated. In the conventional projector, only one of the p-polarized light beam and the s-polarized light beam can be used and the light loss is large in some polarized light beams. If the second optical element of the present invention is used, however, both of the polarized light beams can be used most efficiently. Therefore, it is possible to obtain a bright image. Since the plurality of divided intermediate light beams are finally superimposed on the single area to be illuminated, the polarized light beams having uniform brightness can be obtained as illumination light even if the light beam emitted from the light source has a non-uniform light intensity distribution within the cross section of the light beam. In particular, even if the intermediate light beams cannot be separated into the p-polarized light beams and the s-polarized light beams with uniform light intensity distribution or spectral characteristics, or even if the light intensity or the spectral characteristics of one of the p-polarized light beams is changed in a process of making the polarization directions of both of the polarized light beams uniform, polarized light beams having uniform brightness and less color shading can be obtained as illumination light.

A second projector of the present invention may consist of: a light source, a first optical element for condensing a light beam from the light source and dividing the light beam into a plurality of intermediate light beam, a second optical element placed on the light-emitting side of the first optical element for converting the plurality of intermediate light beam into one type of polarized light beams and for superimposing the polarized light beams on a reflection-type modulation device, an optical color-light-producing system for producing a plurality of color light by time division from light emitted from the second optical element, only one reflection-type modulation device for modulating color light produced by the optical color-light-producing system, a polarized light beam selection element placed on an optical path between the second optical element and the reflection-type modulation device for reflecting or transmitting the light emitted from the second optical element to allow the light to reach the reflection-type modulation device and for transmitting or reflecting light modulated by the reflection-type modulation device to allow the light to reach a projection optical system, and a collimating lens placed between the second optical element and the polarized light beam selection element.

It is possible to obtain advantages similar to those of the first projector by the second projector of the present invention. Furthermore, since a color image can be displayed without containing a color filter of large light loss in the reflection-type modulation device, it is possible to prevent the light loss and obtain a bright projected image.

A third projector of the present invention may consist of: a light source, a first optical element for condensing a light beam from the light source and dividing the light beam into a plurality of intermediate light beams, a second optical element placed on the light-emitting side of the first optical element for converting the plurality of intermediate light beams into one type of polarized light beams and for superimposing the polarized light beams on a reflection-type modulation device, three reflection-type modulation devices for modulating color light of three colors, an optical color-light-separating-and-synthesizing system for separating a light beam emitted from the second optical element into color light of three colors and for synthesizing each color light modulated by the three reflection-type modulation devices, a polarized light beam selection element placed on an optical path between the second optical element and the optical color-light-separating-and-synthesizing system for reflecting or transmitting the light emitted from the second optical element to allow the light to reach the optical color-light-separating-and-synthesizing system and for transmitting or reflecting the light synthesized by the optical color-light-separating-and-synthesizing system to allow the light to reach a projection optical system, and a collimating lens placed between the second optical element and the polarized light beam selection element.

In the second projector of the present invention, since the function of separating light and the function of synthesizing light are achieved by the same unit, the necessity for placing dichroic mirrors 401 and 402, or reflecting mirrors 403, 404, and 405, as in the above-described conventional projector, is eliminated. Therefore, the length of the optical path can be extremely shortened, and the loss of light can be minimized. Therefore, an extremely bright projected image can be obtained without using a large-aperture projection lens.

As the first optical element, a lens array having, for example, a plurality of light beam-dividing lenses arranged in a matrix may be used. By dividing the light beam from the light source into a plurality of intermediate light beams with such a lens array, and by superimposing the intermediate light beams on an area to be illuminated, non-uniform luminance can be further reduced than that of a single light beam. Therefore, even if the light beam emitted from the light source has a non-uniform light intensity distribution within a cross section of the light beam, illumination light having uniform brightness can be obtained. In particular, when the light intensity distribution of the light beam is not random, but the light intensity distribution has a fixed tendency as seen in a light beam emitted from a light source composed of a light source lamp and a paraboloidal reflector, the use of the above first optical element can make the light intensity distribution and angular distribution of the illumination light on the area to be illuminated extremely uniform.

The second optical element separates each of the intermediate light beams into a p-polarized light beam and an s-polarized light beam, aligns the polarization direction of one of the polarized light beams with that of the other one of polarized light beams, and finally superimposes the light beams on a single area to be illuminated. In the conventional projector, only one of the p-polarized light beams and the s-polarized light beams can be used, and the light loss is large in some polarized light beams. If the second optical element of the present invention is used, however, both of the polarized light beams can be used most efficiently. Therefore, it is possible to obtain a bright image. Since the plurality of divided intermediate light beams are finally superimposed on the single area to be illuminated, the polarized light beams having uniform brightness can be obtained as illumination light even if the light beam emitted from the light source has a non-uniform light intensity distribution within the cross section of the light beam. In particular, even if the intermediate light beams cannot be separated into the p-polarized light beams and the s-polarized light beams with uniform light intensity distribution or spectral characteristics, or even if the light intensity or the spectral characteristics of one of the p-polarized light beams is changed in a process of aligning the polarization directions of both of the polarized light beams, polarized light beams having uniform brightness and less color shading can be obtained as illumination light.

In the third projector, one of constructions including two dichroic prisms, including one cross-dichroic prism, and including a wedge-like prism can be used as the color-light-separating-and-synthesizing optical system.

A fourth projector of the present invention may consist of: a light source, a first optical element for condensing a light beam from the light source and dividing the light beam into a plurality of intermediate light beams, a second optical element placed on the light-emitting side of the first optical element for converting the plurality of intermediate light beams into one type of polarized light beams and for superimposing the polarized light beams on a reflection-type modulation device, an optical color-light-separating system for separating a light beam emitted from the second optical element into color light of three colors, three modulation devices for modulating each of the color light separated by the optical color-light-separating system, an optical color-light-synthesizing system for synthesizing the color light modulated by the three modulation devices, three polarized light beam selection elements placed on an optical path between the optical color-light-separating system and the optical color-light-synthesizing system for reflecting or transmitting the light emitted from the optical color-light-separating system to allow the light to reach each of the modulation devices, and for transmitting or reflecting the light modulated by the modulation devices to allow the light to reach the optical color-light-synthesizing system, and three collimating lenses, each placed between the optical color light-separating system and the polarized light beam selection element.

As the first optical element, a lens array having, for example, a plurality of light beam-dividing lenses arranged in a matrix may be used. By dividing the light beam from the light source into a plurality of intermediate light beams with such a lens array, and by superimposing the intermediate light beams on an area to be illuminated, non-uniform luminance can be further reduced than that of a single light beam. Therefore, even if the light beam emitted from the light source has a non-uniform light intensity distribution within a cross section of the light beam, illumination light having uniform brightness can be obtained. In particular, when the light intensity distribution of the light beam is not random, but the light intensity distribution has a fixed tendency as seen in a light beam emitted from a light source composed of a light source lamp and a paraboloidal reflector, the use of the above first optical element can make the light intensity distribution and angular distribution of the illumination light on the area to be illuminated extremely uniform.

The second optical element separates each of the intermediate light beams into a p-polarized light beam and an s-polarized light beam, aligns the polarization direction of one of the polarized light beams with that of the other one of polarized light beams, and finally superimposes the light beams on a single area to be illuminated. In the conventional projector, only one of the p-polarized light beam and the s-polarized light beam can be used and the light loss is large in some polarized light beams. If the second optical element of the present invention is used, however, both of the polarized light beams can be used most efficiently. Therefore, it is possible to obtain a bright image. Since the plurality of divided intermediate light beams are finally superimposed on the single area to be illuminated, the polarized light beams having uniform brightness can be obtained as illumination light even if the light beam emitted from the light source has a non-uniform light intensity distribution within the cross section of the light beam. In particular, even if the intermediate light beams cannot be separated into the p-polarized light beams and the s-polarized light beams with uniform light intensity distribution or spectral characteristics, or even if the light intensity or the spectral characteristics of one of the p-polarized light beams is changed in a process of aligning the polarization directions of both of the polarized light beams, polarized light beams having uniform brightness and less color shading can be obtained as illumination light.

In the fourth projector, since the three polarized light beam selection elements corresponding to each of color light are used, the wavelength range of the polarized light beam selection elements can be restricted, and both an increase in performance and a cost reduction can be relatively easily achieved. Therefore, it is possible to realize a brighter projected image having a wider range of colors.

As a polarized light conversion element of the second optical element in the above first to fourth projectors, a plate-like polarized light conversion element can be employed which includes a polarized light separation unit array in which a plurality of polarized light separation units each having a pair of a separation surface and a reflection surface for polarized light are aligned and a selective phase film in which $\lambda/2$ phase layers are regularly formed. By employing such a polarized light conversion element, polarized light conversion can be performed with a small space and without extending the width of the light beam emitted from the light source.

In this case, it is preferable that a light-shielding plate array for preventing the intermediate light beams from directly entering the portions of the reflection surfaces be placed on the incident side of the polarized light separation unit array. If such a light-shielding plate array is placed, a degree of polarization of the polarized light beams emitted from the second optical element can be further increased.

In the above first to fourth projectors, it is preferable that the one type of polarized light beams emitted from the second optical element be p-polarized light beams with respect to the polarized light beam selection element. With this construction, a projected image having high contrast can be easily obtained.

In the above first to fourth projectors, a polarizer may preferably be provided on an optical path between the polarized light beam selection element and the projection optical system. With this construction, a degree of polarization of the polarized light emitted from the polarized light beam selection element. Accordingly, an image projected on a display plane or a projection plane via the projection optical system can be increased. Therefore, by placing the polarizer in this way, the contrast of the projected image can be increased, and the extreme high-quality projected image can be obtained.

DETAILED DESCRIPTION OF PREFERRED EMBODIMENTS

Figure 1:
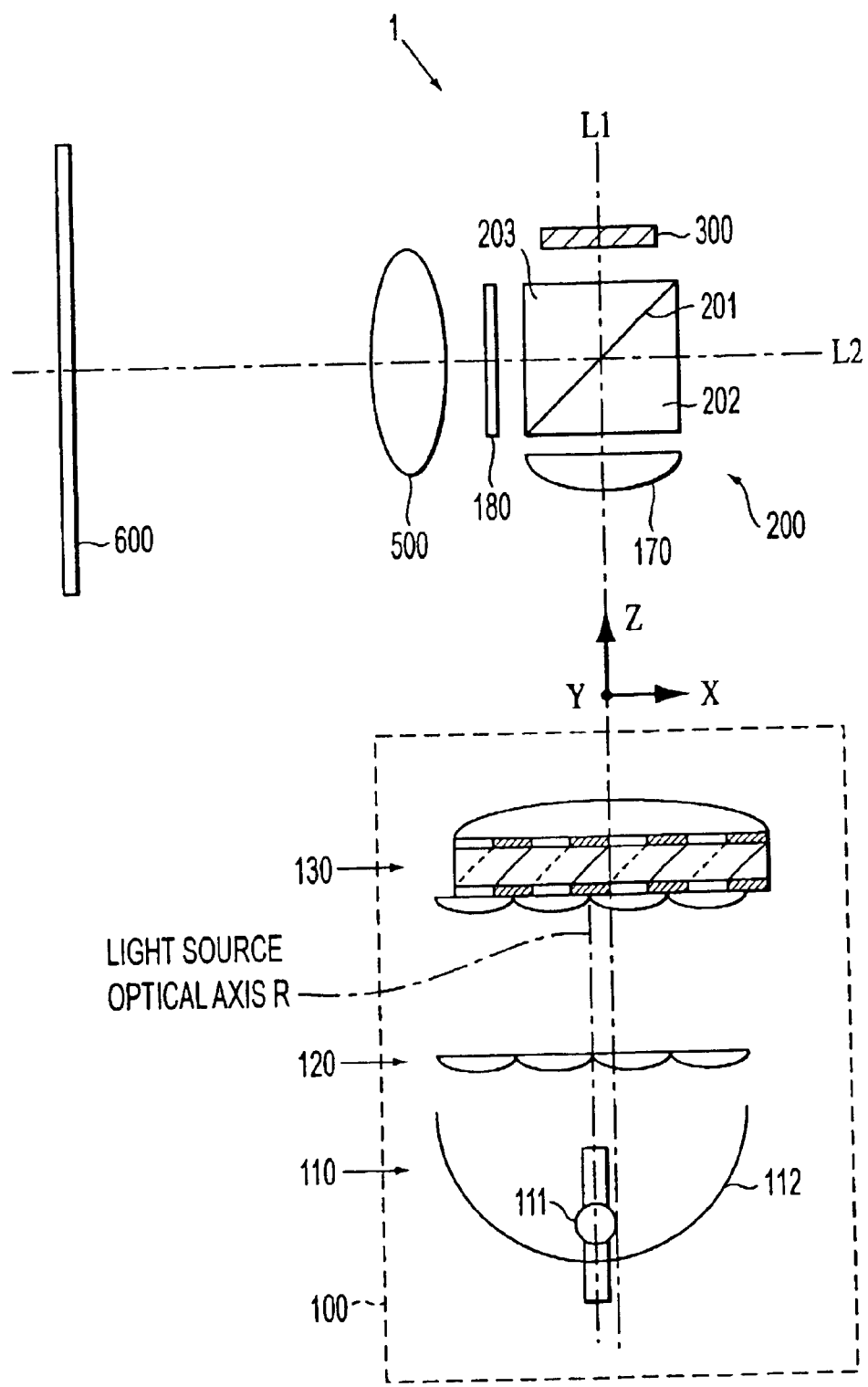
FIG. 1 schematically shows the construction of a principal part of a projector 1 of a first embodiment.

Embodiments of the present invention will now be described with reference to the drawings. In the following embodiments, three directions which are perpendicular to each other are conveniently referred to as the X direction, the Y-axis direction, and the Z-axis direction, and the Z-axis direction is referred to as the direction of light propagation.
First Embodiment FIG. 1 includes a schematic plan view showing the construction of a principal part of a projector 1 of the first embodiment, and a sectional view in the XZ plane passing through the center of a first optical element 120 to be described hereinbelow.

The projector 1 of this embodiment is mainly composed of a polarized light beam illumination device 100 which is mainly composed of a light source 110 placed along two system optical axes L1 and L2 which are perpendicular to each other, a first optical element 120, and a second optical element 130; a reflection-type liquid crystal device 300 for optically modulating polarized light beams from the polarized light beam illumination device 100 according to external image information (not shown) to produce a modulated light beam; an projection optical system 500 for projecting the light beam modulated by the reflection-type liquid crystal device 300 on a projection plane 600; a polarized light beam selection element 200 placed between the reflection-type liquid crystal device 300 and the polarized light beam illumination device 100, transmitting the polarized light beams from the polarized light beam illumination device 100 and allowing the polarized light beams to reach the reflection-type liquid crystal device 300, and reflecting the light beam modulated by the reflection-type liquid crystal device 300 and allowing the modulated luminous flux to reach the projection optical system 500; a collimating lens 170 placed between the polarized light beam illumination device 100 and the polarized light beam selection element 200; and a polarizer 180 placed between the polarized light beam selection element 200 and the projection optical system 500.

The light source 110 is mainly composed of a light source lamp 111 and a paraboloidal reflector 112. Light emitted from the light source lamp 111 is reflected by the paraboloidal reflector 112 in one direction, and becomes substantially a parallel light beam which enters the first optical element 120. A metal halide lamp, a xenon lamp, a high-pressure mercury lamp, or a halogen lamp can be used as the light source lamp 111, and an ellipsoidal reflector or a spherical reflector can be used as the reflector in addition to the paraboloidal reflector, described in this embodiment.

Figure 2:
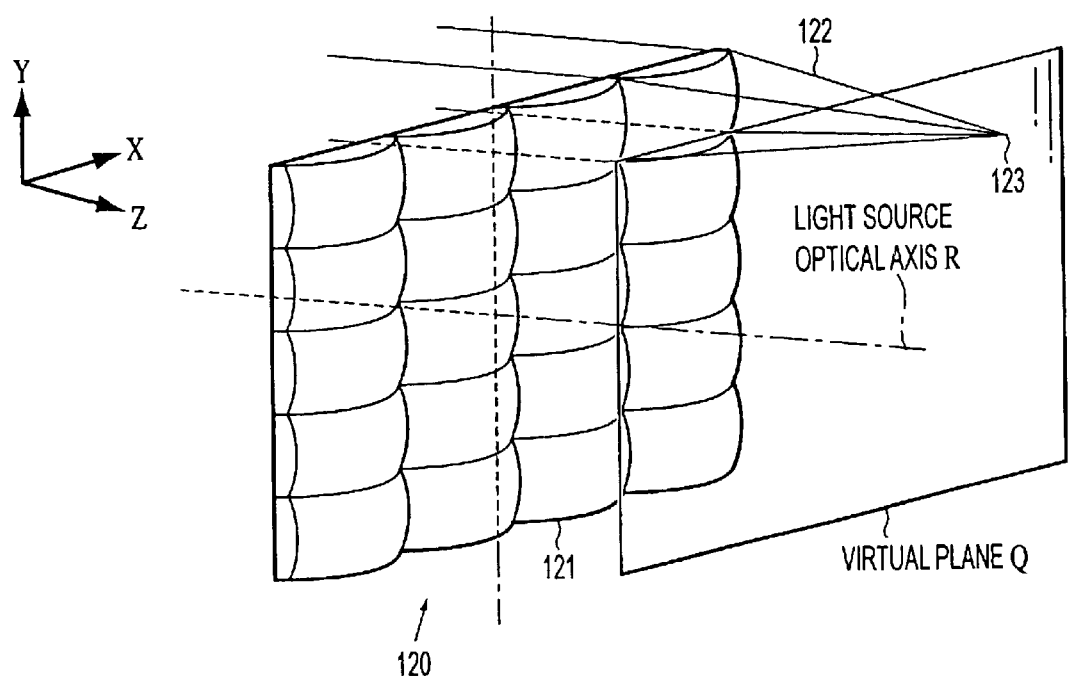
FIG. 2 is a perspective view showing the construction of a first optical element 120 in a polarized light beam illumination device 100.

The first optical element 120, as the appearance thereof is shown in FIG. 2, is a lens array including a plurality of rectangular light beam-dividing lenses 121 arranged in the form of a matrix. The positional relationship between the light source 110 and the first optical element 120 is set so that a light source optical axis R is placed substantially in the center of the first optical element 120. The light incident on the first optical element 120 is divided into a plurality of intermediate light beams by the light beam-dividing lenses 121, and at the same time, by a condensing operation of the light beam-dividing lenses, as many focal images 123 as the number of light beam-dividing lenses are formed at positions within a plane perpendicular to the system optical axis L1 (the XY plane in FIG. 1) where the intermediate light beams converge. Hereinafter, a plane on which these focal images 123 are formed is referred to as a virtual plane Q. The shape of the cross section of each light beam-dividing lens 121 may be designed so as to be nearly similar to the shape of a display area (area to be illuminated) of the reflection-type liquid crystal device 300. In this embodiment, the display area is assumed to have a rectangular area on the XY plane to be illuminated that is longer in the X direction, thus the cross section of each light beam-dividing lens 121 also has a rectangular shape that is longer in the X direction.

Figure 3:
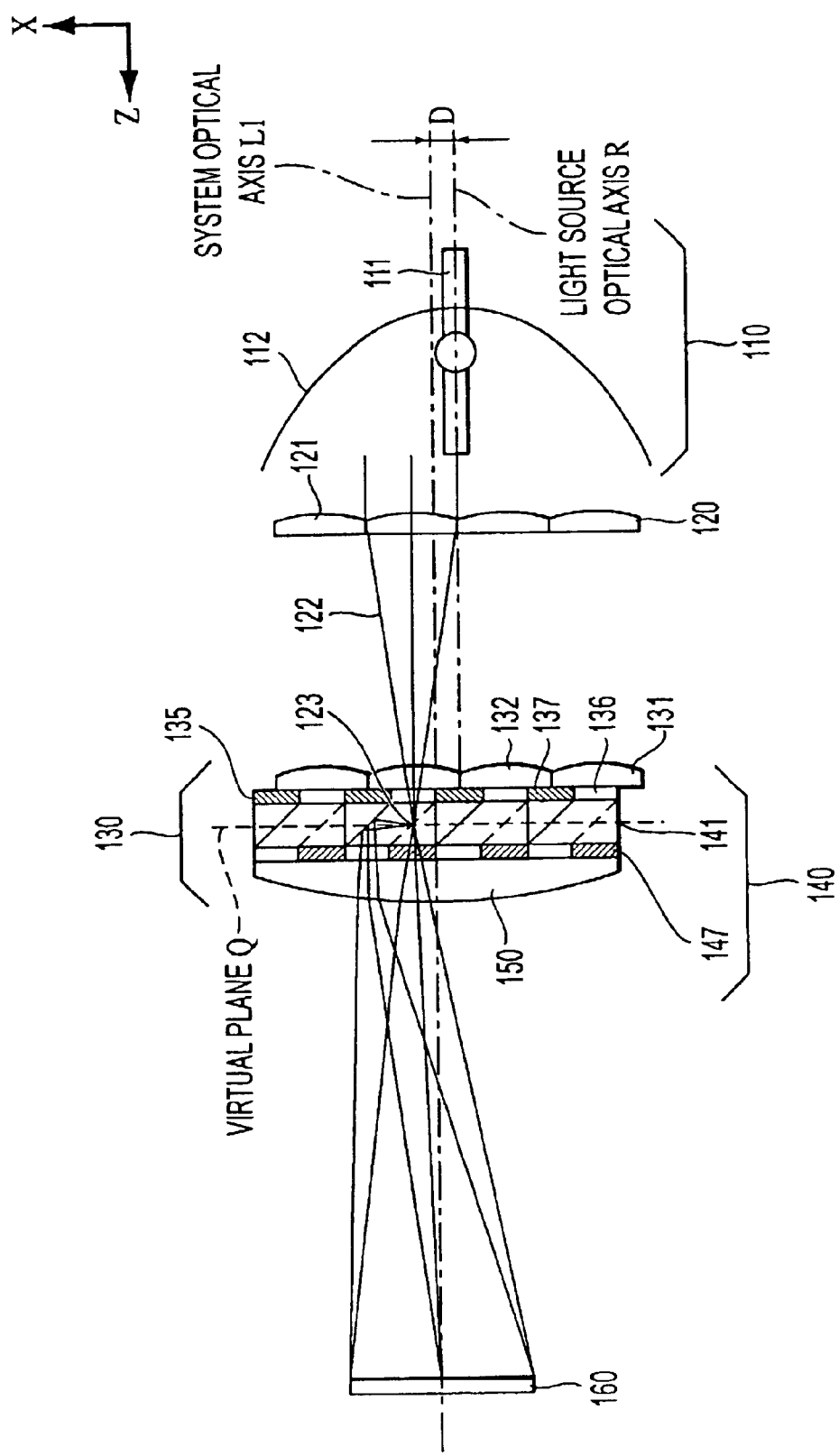
FIG. 3 is a view for the explanation of the function of a second optical element 130 in the polarized light beam illumination device 100.

The function of the second optical element 130 will now be described with reference to FIG. 3.

The second optical element 130 is a composite element which is placed on or near the virtual plane Q, and is generally consisted of a condenser lens array 131, a light-shielding plate array 135, a plate-like polarized light conversion element 140 comprising a polarized light separation unit array 141 and a selective phase film 147, and a superimposing lens 150 for superimposing intermediate light beams 122 emitted from the polarized light conversion element 140 on a predetermined area 160 to be illuminated. The second optical element 130 has the function of separating each of the intermediate light beams 122 into a p-polarized light beam and an s-polarized light beam, of converting the beams into one type of polarized light beams, and of superimposing the polarized light beams on one area 160 to be illuminated.

A placement pattern of the condenser lens array 131, the polarized light conversion element 140 and the superimposing lens 150 which constitute the second optical element 130 is not limited to one pattern, but various placement patterns can be employed. More specifically, the following three patterns can be used, each including the placement order from the light source 110. Pattern 1: the condenser lens array 131, the polarized light conversion element 140, and the superimposing lens 150; Pattern 2: the polarized light conversion element 140, the condenser lens array 131, and the superimposing lens 150; and Pattern 3: the condenser lens array 131, the superimposing lens 150, and the polarized light conversion element 140. Pattern 1 is easily employed when attaching importance to light utilization factor in the polarized light conversion element 140, and Pattern 1 is employed in this embodiment.

The condenser lens array 131 is constructed, in a manner similar to the first optical element 120, by aligning a plurality of condenser lenses 132, as many as the light beam-dividing lenses constituting the first optical element 120, in a matrix. There is no restriction on the external shape of each condenser lens 132 on the XY plane. However, if a shape can be arrayed easily, such as a rectangular or hexagonal shape, the cost of manufacturing the condenser lens array 131 can be reduced. Therefore, in this embodiment, the condenser lens array 131 is constructed using condenser lenses each having a shape substantially similar to that of the light beam-dividing lenses 121 constituting the first optical element 120. The condenser lens array 131 has the function of transmitting images formed on the light beam-dividing lenses 121 of the first optical element 120 on the single area 160 to be illuminated via the polarized light separation unit array 141 and the superimposing lens 150. In addition, in this embodiment, since the condenser lens array 131 is placed on the incident side of the polarized light conversion element 140, the condenser lens array 131 has the function of introducing the intermediate light beams 122 from the first optical element 120 into a specific incident end surface of the polarized light conversion element 140, and of converting the intermediate light beams so that central axes of the intermediate light beams are substantially parallel to the system optical axis L1. In general, in order to increase polarization convertibility of the polarized light conversion element 140, the intermediate light beams 122 are preferably incident on polarized beam separation surfaces 143 to be described hereinbelow at an incident angle of 45 degrees, that is, incident on the incident end surface of the polarized light conversion element 140 at an incident angle of 0 degree. Therefore, lens characteristics of the condenser lenses 132 are set according to the characteristics of the intermediate light beams 122 divided by the first optical element 120. With regard to the placement pattern of the condenser lens array 131, the polarized light conversion element 140, and the superimposing lens 150, the placement Patterns 2 and 3 can be employed as described above. In particular, these patterns are suitable when the light beams emitted from the light source 110 have excellent parallelism. In the above two patterns, since the condenser lens array 131 is adjacent to the superimposing lens 150, the cost of the illumination device can be reduced by allowing the condenser lens array 131 to also have the function of the superimposing lens 150, thereby allowing the superimposing lens 150 to be omitted. In these patterns, however, since the incident angle of the intermediate light beams incident on the polarized beam separation surfaces 143 of the polarized light conversion element 140 varies for each polarized light separation unit 142 to be described hereinbelow, it is preferable that optical characteristics of the polarized beam separation surfaces 143 be set for each polarized light separation unit 142.

Figure 4A:
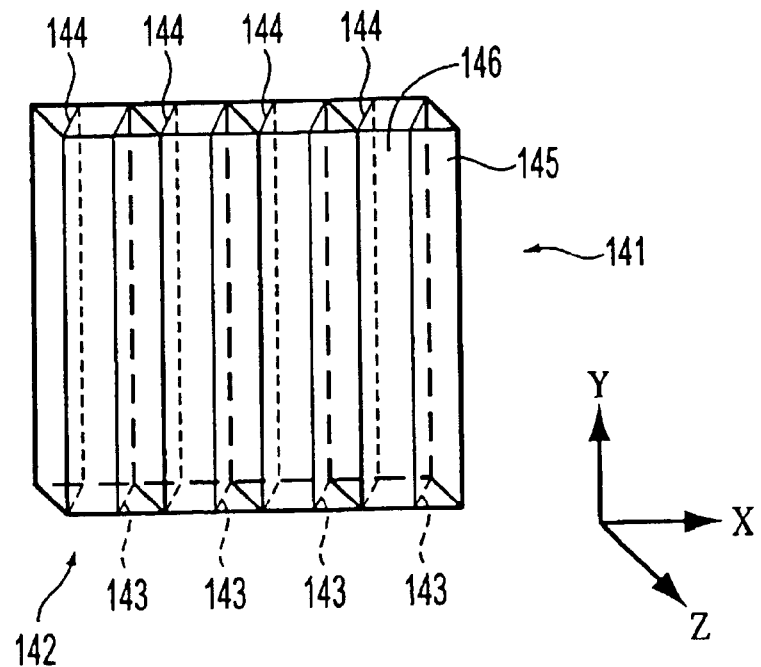
FIG. 4(A) is a perspective view showing the construction of a polarized light separation unit array 141 in the polarized light beam illumination device 100.

As shown in FIG. 4(A), the polarized light separation unit array 141 is composed of a plurality of polarized light separation units 142 aligned in the X-axis direction. Each of the polarized light separation units 142 is a square rod-like structure including the polarized beam separation surface 143 and a reflection surface 144 as a pair within a prism formed of optical glass, and has the function of separating each of incident intermediate light beams into a p-polarized light beam and an s-polarized light beam, respectively. The polarized beam separation surfaces 143 and the reflection surfaces 144 are arranged so that they are alternately aligned in the X-axis direction while keeping them substantially parallel, and they are inclined about 45 degrees with respect to the system optical axis L1. In addition, the polarized beam separation surfaces 143 and the reflection surfaces 144 are arranged so as not to overlap, and therefore, an area of each polarized beam separation surface 143 projected on the XY plane is equal to an area of each reflection surface 144 projected on the XY plane. Each of the polarized beam separation surfaces 143 can be formed by a dielectric multilayer film and the like, and each of the reflection surfaces 144 can be formed by a dielectric multilayer film or an aluminum film. The polarized light separation unit array 141 may have a structure including therein a plurality of pairs of the polarized beam separation surfaces 143 and the reflection surfaces 144, and is not necessarily composed of a plurality of the polarized light separation units 142. The idea of the polarized light separation unit 142 is merely introduced for easy explanation of the function of the polarized light separation unit array 141. Furthermore, all of the polarized light separation units 142 are not necessarily aligned in the same direction. For example, each of the polarized light separation units 142 may be placed so that each polarized beam separation surface 143 can be folded and positioned using the YZ plane as a plane of symmetry. The alignment direction of the polarized light separation units 142 is not limited to one direction. For example, the polarized light separation unit array 141 may be composed of the polarized light separation units 142 aligned in the X-axis direction and the polarized light separation units 142 aligned in the Y-axis direction. In short, it is preferable that the method of alignment of the polarized light separation units 142 be determined so that the intermediate light beams 122 can be efficiently incident on the polarized beam separation surfaces 143. Furthermore, the placement distance (plane distance) between each polarized beam separation surface 143 and each reflection surface 144 is equally set for all the polarized light separation units 142, and the distance may be different for each polarized light separation unit 142.

Light incident on the polarized light separation unit 142 is separated into p-polarized light beams transmitted by the polarized beam separation surfaces 143 and s-polarized light beams reflected by the polarized beam separation surfaces 143 to change the direction of travel toward the reflection surfaces 144. The p-polarized light beams are emitted from a p-polarized light-beam emitting surface 145 of the polarized light separation unit 142. On the other hand, the s-polarized light beams are reflected by the reflection surfaces 144 and become substantially parallel to the p-polarized light beams to be emitted from an s-polarized light-beam emitting surface 146 of the polarized light separation unit 142. That is, the intermediate light beams 122 incident on the polarized light separation unit 142 and having random polarization directions are separated by the polarized light separation unit 142 into p-polarized light beams and s-polarized light beams, and are emitted from the p-polarized light-beam emitting surface 145 and the s-polarized light beam-emitting surface 146 in substantially the same direction. There is some way to construct polarized beam separation surfaces that reflect the p-polarized light beams and transmit the s-polarized light beams, and such polarized beam separation surfaces may be used in the polarized light separation unit 142 of the present invention.

In the polarized light beam illumination device 100 of the present invention, it is necessary to guide the intermediate light beams into the polarized beam separation surfaces 143 of the polarized light separation unit 142. Therefore, in this embodiment, the condenser lens array 131 is placed in a state of being shifted in the X-axis direction with respect to the polarized light separation unit array 141 by a distance D equivalent to ¼ of the width W of the polarized light separation unit 142 so that the intermediate light beams 123 are condensed at the center portions of the polarized beam separation surfaces 143. The first optical element 120 and the light source 110 are similarly placed in a state of being shifted in parallel (see FIG. 3).

On the incident side of the polarized light separation unit array 141, the light-shielding plate array 135 is placed for allowing the intermediate light beams 122 to be incident only on the polarized beam separation surfaces 143 and preventing the intermediate light beams 122 from being directly incident on the reflection surfaces 144. The light-shielding plate array 135 has openings 136 and light-shielding portions 137 arrayed corresponding to the polarized beam separation surfaces 143 and the reflection surfaces 144 of the polarized light separation unit array 141. A light-shielding plate array in which light-shielding plates, such as metal plates, are arrayed or conversely, a light-shielding plate in which openings are arrayed in a light-shielding flat plate can be used. The placement of such a light-shielding plate array can decrease light beams incident on the reflection surfaces 144 and emitted from the polarization beam separation surfaces 143 of the polarized light separation unit array 141, so that a degree of polarization of the polarized light beams emitted from the polarized light conversion element 140 can be further increased, and this is suitable for obtaining polarized light beams incident on the reflection-type liquid crystal device 300. The position of the light-shielding plate array 135 is not limited to the incident side of the polarized light separation unit array 141, and it may be placed on the incident side of the condenser lens array 131. The light-shielding plate array 135 may be an optical element that does not have complete light-shielding properties, such as a light-scattering element, as long as it does not lose the essence of the function thereof. Furthermore, when the parallelism of the light beams emitted from the light source 110 is high, very small focal images can be formed by the light beam-dividing lenses 121. In this case, the light-shielding plate array 135 may be omitted.

Figure 4B:
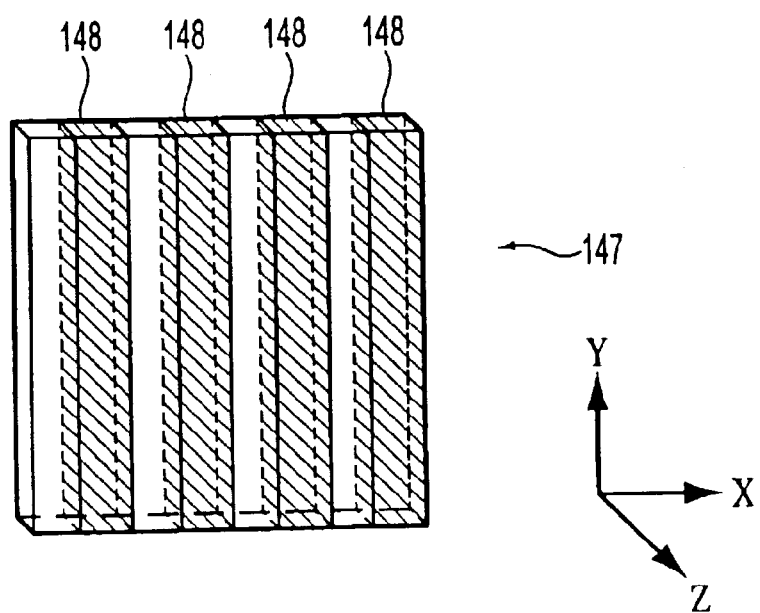
FIG. 4(B) is a perspective view showing the construction of a selective phase film 147.

On the side of the light emitting surface of the polarized light separation unit array 141, the selective phase film 147 is placed in which $\lambda/2$ phase layers 148 are regularly formed. FIG. 4(B) shows an example of the selective phase film 147. The selective phase film 147 is an optical element in which the $\lambda/2$ phase layers 148 are formed only on the s-polarized light-beam emitting surface 146, and the $\lambda/2$ phase layers 148 are not formed on the p-polarized light beam-emitting surface 145. Therefore, the s-polarized light beams emitted from the polarized light separation unit 142 are rotated by the $\lambda/2$ phase layers 148 in the polarization direction when passing through the selective phase film 147, and are converted into the p-polarized light beams. On the other hand, since the $\lambda/2$ phase layers 148 are not formed on the p-polarized light-beam emitting surface 145, the p-polarized light beams emitted from the p-polarized light-beam emitting surface 145 of the polarized light separation unit 142 pass through the selective phase film 147 as they are.

That is, the intermediate light beams 122 emitted from the first optical element 120 and having random polarization directions are separated by the polarized light separation unit array 141 into p-polarized light beams and s-polarized light beams, and are converted by the selective phase film 147 into one type of polarized light beams (in this embodiment, p-polarized light beams) having a uniform polarization direction.

The superimposing lens 150 (FIG. 3) placed on the side of light emitting surface of the polarized light conversion element 140 functions as a superimposing element for superimposing the intermediate light beams 122 converted by the polarized light conversion element 140 into the p-polarized light beams on the area 160 to be illuminated (display area of the reflection-type liquid crystal device 300). That is, each of the intermediate light beams 122 (in other words, image surfaces cut out by the light beam-dividing lenses 121) is converted by the polarized light conversion element 140 into one type of polarized light beams having a uniform polarization direction, and is superimposed by the superimposing lens 150 on the single area 160 to be illuminated. In this case, since the light intensity is averaged in the process of superimposing the plurality of divided intermediate light beams even if the light intensity distribution of each light beam incident on the first optical element is not uniform within its incident cross section, the light intensity distribution of the illumination light on the area to be illuminated is nearly uniform. Therefore, one type of polarized light beams can nearly uniformly illuminate the area 160 to be illuminated. The superimposing lens 150 is not necessarily a single lens element, and may be a lens array composed of a plurality of lenses like the first optical element 120.

In summary, illumination light having uniform brightness and a substantially aligned polarization direction can be obtained by the polarized light beam illumination device 100. In the polarized light beam illumination device 100, a plurality of very small focal images 123 are formed by the first optical element 120, and spaces generated in the formation process of the focal images where light does not exit are well utilized, and the reflection surfaces 144 of the polarized light separation unit 142 are placed in the spaces. Therefore, the polarized light beam illumination device 100 is characterized in that widening of the light beam occurs when separating light beams emitted from the light source into two types of polarized light beams can be restricted and polarized light conversion can be effected with a small space. The shape of the cross section of each of the light beam-dividing lenses 121 constituting the first optical element 120 is formed in the rectangular shape elongated in the X-axis direction in accordance with the rectangular shape of the area 160 to be illuminated, which is elongated in the X-axis direction, and the polarized-beam separation direction in the polarized light separation unit 142 is set to the X-axis direction so that two types of polarized light beams emitted from the polarized light separation unit array 141 are aligned in the X-axis direction. Therefore, the incident angle of each of the light beams incident on the area 160 to be illuminated can be decreased, whereby light utilizing efficiency in the area 160 to be illuminated is increased.

The condenser lens array 131, the polarized light separation unit array 141, the selective phase film 147, and the superimposing lens 150, which constitute the second optical element, are optically integrated so as to reduce the light loss generated at the interfaces thereof and further increase light utilization factor. These optical devices, however, are not necessarily optically integrated.

A description will be given returning to FIG. 1 again. The collimating lens 170 is placed on the incident side of the polarized light beam selection element 200, and has the function of converting the plurality of intermediate light beams 122 incident on the polarized light beam selection element 200 into light beams substatially parallel to the central axes thereof. In general, since polarized-beam selecting performance of the polarized light beam selection element 200 and display performance of the reflection-type liquid crystal device 300 have great angular dependency with respect to the incident light beam, it is preferable that the collimating lens 170 be placed on the incident side of the polarized light beam selection element 200 to decrease the incident angle of the light beams incident on the polarized light beam selection element 200 or the reflection-type liquid crystal device 300. Therefore, the collimating lens 170 may be placed between the polarized light beam selection element 200 and the reflection-type liquid crystal device 300, or the collimating lens 170 may be omitted according to the optical characteristics of the polarized light beam selection element 200 or the reflection-type liquid crystal device 300. Optical integration of the collimating lens 170 and the polarized light beam selection element 200 is effective for increasing light utilization factor because the light loss generated at the interfaces of the collimating lens 170 and the polarized light beam selection element 200 can be reduced.

The polarized light beam selection element 200 has a polarized light beam selection film 201 formed on mating faces of two prism parts 202 and 203. The polarized light beam selection film 201 is composed of a dielectric multi-layer film or the like, which reflects s-polarized light beams, and transmits p-polarized light beams. As described previously, since almost all of the light beams emitted from the polarized light beam illumination device 100 are converted into one type of polarized light beams, almost all of the light beams emitted from the polarized light beam illumination device 100 will be transmitted or reflected by the polarized light beam selection film 201. In this embodiment, since almost all of the light beams emitted from the second optical element 130 are p-polarized light beams, almost all of the light beams incident on the polarized light beam selection element 200 are transmitted by the polarized light beam selection film 201 to reach the reflection-type liquid crystal device 300.

When the light beams emitted from the second optical element 130 are s-polarized light beams, the light beams incident on the polarized light beam selection element 200 are reflected by the polarized light beam selection film 201. Therefore, in such a case, the reflection-type liquid crystal device 300 may be placed so as to oppose the optical projection system 500 across the polarized light beam selection element 200. In addition, a polarized light beam selection film for reflecting the p-polarized light beams and transmitting the s-polarized light beams can be realized according to the construction of the polarized light beam selection film 201 of the polarized light beam selection element 200, and such a polarized light beam selection film may be used in the polarized light beam selection element 200 of the present invention.

The light beams incident on the reflection-type liquid crystal device 300 change the polarization state based on external image information (not shown), and become modulated light beams including the image information.

Figure 5:
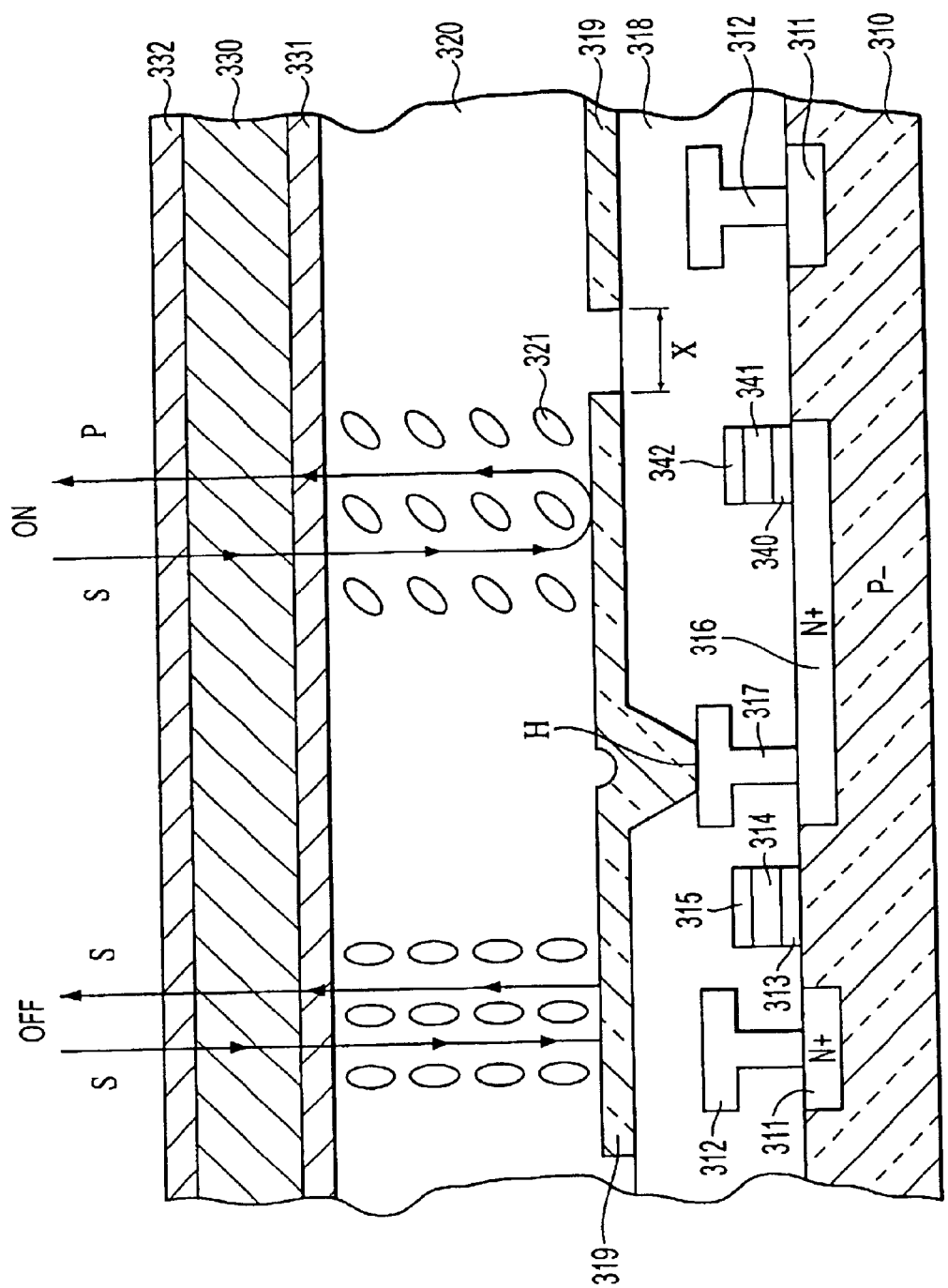
FIG. 5 is a schematic sectional view showing an example of a reflection-type liquid crystal device.

An example of the reflection-type liquid crystal device 300 is shown in FIG. 5. The reflection-type liquid crystal device 300 is an active-matrix-type liquid crystal device in which switching elements consisting of thin-film transistors are connected to reflective pixel electrodes 319 arranged in a matrix, and has a structure in which a liquid crystal layer 320 is sandwiched between a pair of substrates 310 and 330. The substrate 310 is made of silicon, and sources 311 and drains 316 are formed on a part thereof. A source electrode 312 and a drain electrode 317 each made of aluminum, a channel 313 made of silicon dioxide, a gate electrode including a silicon layer 314 and a tantalum layer 315, an interlayer insulating film 318, and the reflective pixel electrodes 319 made of aluminum are formed on the substrate 310, and the drain electrode 317 and the reflective pixel electrode 319 are electrically connected via a contact hole H. Since the reflective pixel electrodes 319 are opaque, they can be deposited on the gate electrode, the source electrode 312, and the drain electrode 317 via the interlayer insulating film 318. Therefore, the distance X between the adjacent reflective pixel electrodes 319 can be considerably shortened, and a large aperture ratio can be obtained. In this embodiment, a holding capacitor section is composed of the drain 316, a silicon dioxide layer 340, a silicon layer 341, and a tantalum layer 342.

On the other hand, the opposing substrate 330 has a counter electrode 331 made of ITO which is formed on the surface of the liquid crystal layer 320, and a reflection-preventing layer 332 formed on the other surface. A voltage is applied between the counter electrode 331 and each of the pixel electrodes 319, whereby the liquid crystal layer 320 is driven.

The liquid crystal layer 320 is of a super-homeotropic type in which liquid crystal molecules are vertically aligned when a voltage is not applied (OFF), and the liquid crystal molecules are twisted by 90 degrees when the voltage is applied (ON). As shown in FIG. 5, p-polarized light beams incident on the reflection-type liquid crystal device 300 from the polarized light beam selection element 200 when the voltage is not applied (OFF) are emitted from the reflection-type liquid crystal device 300 without changing the polarization directions thereof, transmitted by the polarized light beam selection element 200, and returned to the polarized light beam illumination device 100. Therefore, the p-polarized light beams do not enter the projection optical system 500. On the other hand, the polarization direction of the p-polarized light beams incident on the reflection-type liquid crystal device 300 from the polarized light beam selection element 200 when the voltage is applied (ON) is changed by twisting of the liquid crystal molecules 321, and the p-polarized light beams are converted into s-polarized light beams, reflected by the polarized light beam selection film 201, and then enter the projection optical system 500 to be guided to the projection plane 600.

The polarizer 180 is placed between the polarized light beam selection element 200 and the projection optical system 500 to perform the function of increasing display quality of the projected image by removing undesired polarization present in the polarized light beams emitted from the polarized light beam selection element 200 and increasing the degree of polarization of the light beams incident on the projection optical system 500. Therefore, the polarizer 180 can be omitted according to the optical characteristics of the polarized light beam selection element 200.

As described above, in the projector 1 of this embodiment, the length of the optical path between the reflection-type liquid crystal device 300 and the projection optical system 500 is extremely short. In addition, since the aperture ratio of the liquid crystal device can be increased, the loss of light can be prevented to the fullest extent. Therefore, it is possible to obtain an extremely bright projected image without using a large-aperture projection lens (projection optical system) having a small F-number.

In addition, the first optical element 120 and the second optical element 130 are used, whereby polarized light beams having uniform brightness can be obtained as illumination light. Therefore, it is possible to obtain an extremely bright projected image without non-uniform brightness or color shading on the entire display plane or projection plane.

Furthermore, since the reflection-type liquid crystal device of smaller light absorption is used, the brightness of the projected image can be considerably increased without necessitating a large-scale cooling device, even if a light source lamp having extremely high optical output is used.

Still furthermore, illumination light beams incident on the polarized light beam selection element 200 from the polarized light beam illumination device 100 are p-polarized light beams, and projected light beams emitted from the reflection-type liquid crystal device on the projection plane 600 are s-polarized light beams. In general, the polarized light beam selection film 201 of the polarized light beam selection element 200 formed of a dielectric multilayer film or the like can relatively easily increase s-polarized light beam reflectance as compared with p-polarized light beam transmittance. Therefore, with the construction of this embodiment, a projected image having high contrast can be easily obtained.

The structure of the reflection-type liquid crystal device 300, materials of the components thereof, and an operation mode of the liquid crystal layer 320 are not limited to those in the above-described examples. For example, a TN liquid crystal, an SH liquid crystal and the like can be used as the liquid crystal. In addition, it is possible to use a reflection-type liquid crystal device using a two-terminal nonlinear element, such as a TFD (Thin-Filmed-Diode), as the switching element.

While the above-described reflection-type liquid crystal device 300 is used for displaying a monochrome image, it can display a color image if a color filter is placed inside the reflection-type liquid crystal device 300, or an optical color-light-producing system utilizing a rotary filter or a transmitted wavelength selective element is provided between the light source 110 and the projection optical system 500.

Second Embodiment

Figure 6:
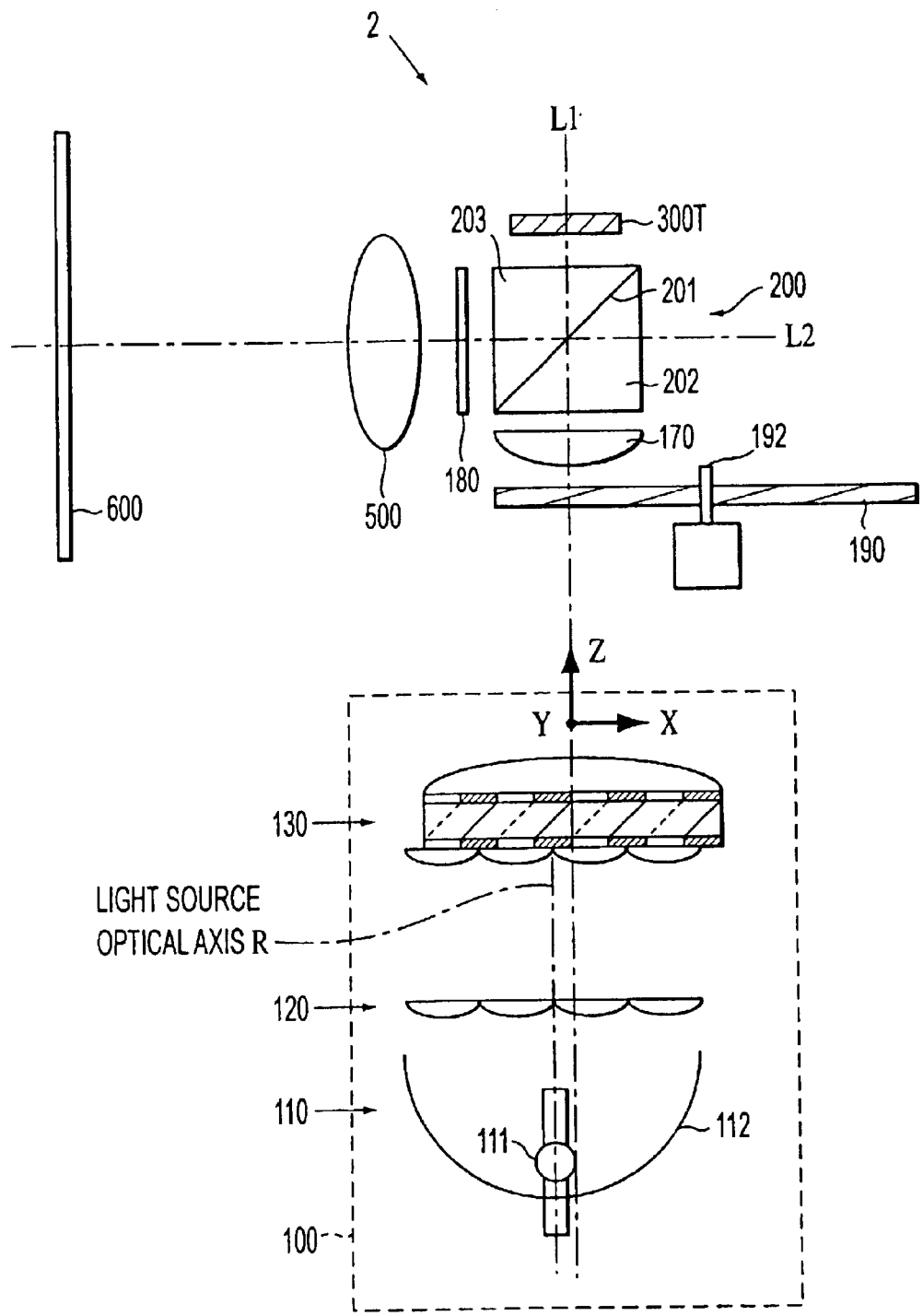
FIG. 6 schematically shows the construction of a principal part of a projector 2 of a second embodiment.

FIG. 6 includes a schematic plan view showing the construction of a principal part of a projector 2 of the second embodiment, and a sectional view in the XZ plane passing through the center of a first optical element 120. In projectors to be described hereinbelow including a projector of this embodiment, components similar to the explained components for the projector 1 (first embodiment) are indicated by the same reference numerals as those used in FIGS. 1 to 5, and a detailed description thereof will be omitted.

In the projector 2 of this embodiment, projecting and displaying of a color image are realized based on the above-described projector 1 of the first embodiment with a construction in which an optical color-light-producing system including a rotary color filter 190 is placed on the incident side of a collimating lens 170, and a time-division-driving-type reflective liquid crystal device 300T is provided instead of the reflection-type liquid crystal device 300. In this embodiment, the collimating lens 170 is also placed on the incident side of a polarized light beam selection element 200, and a polarizer 180 is placed between the polarized light beam selection element 200 and an projection optical system 500, and the functions thereof are similar to those of the first embodiment.

Figure 7:
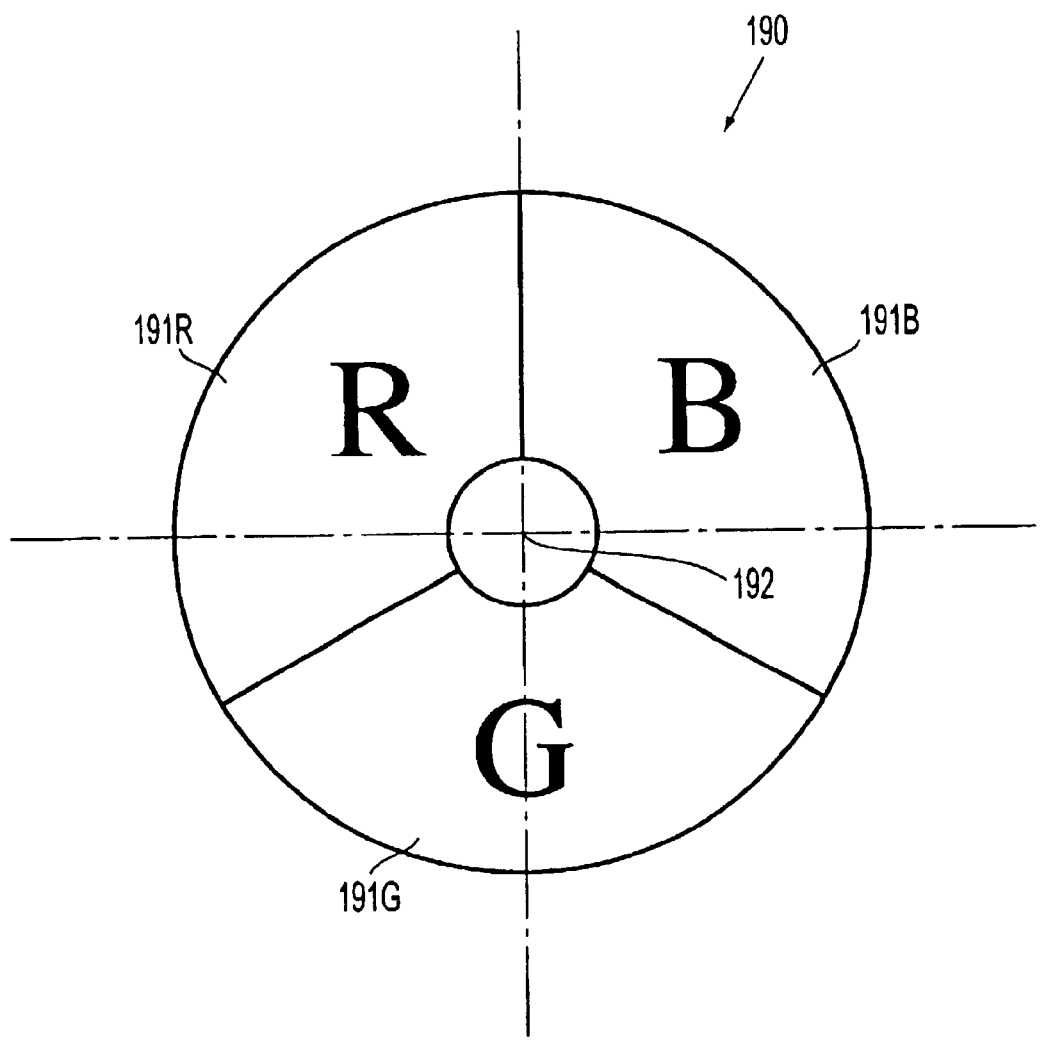
FIG. 7 is an external view of a rotary color filter used in the projector 2 of the second embodiment.

The rotary color filter 190, as the appearance thereof shown in FIG. 7, is formed by dividing a disc-like transparent substrate (for example, glass substrate) into at least three areas, and forming a red-light-transmitting filter 191R, a green-light-transmitting filter 191G, and a blue-light-transmitting filter 191B on the areas, and is rotated by a motor or the like (not shown) using a central axis 192 of the rotary color filter 190 as a rotation axis. Therefore, a light beam emitted from a polarized light beam illumination device 100 becomes time-divided color light by being transmitted by the rotary color filter 190, and enters the time-division-driving-type reflective liquid crystal device 300T. The transmitting filters 191R, 191G, and 191B are formed of a dielectric multilayer film or the like.

The color light incident on the time-division-driving-type reflective liquid crystal device 300T is optically modulated according to external image information (not shown) to produce modulated light beams according to the color light transmitted by the rotary color filter 190, and is then projected on a projection plane 600 by the projection optical system 500. Therefore, the rotation of the rotary color filter 190 is in synchronism with the transmission of the image information to the reflective liquid crystal device 300T by a driver circuit (not shown). Since the modulated light beams according to each of the color light are successively projected on the projection plane 600 for every very short period in this way, the projected images thereof can be recognized as a color image if the projected images are successively seen.

According to the construction as described above, since the projector 2 of this embodiment can display the color image without containing a color filter of a large light loss in the reflection-type liquid crystal device, it is possible to prevent the light loss and obtain a bright projected image.

Furthermore, the first optical element and the second optical element are used, whereby polarized light beams having uniform brightness can be obtained as illumination light. Therefore, it is possible to obtain an extremely bright projected image without non-uniform brightness or color shading on the entire display plane or projection plane.

Although the transmitting filters 191R, 191G, and 191B formed of the dielectric multilayer film have a high light transmittance, they have a drawback that the color tones thereof tend to deviate from desired values with respect to the luminous flux incident thereon at a high angle. In the projector 2 of this embodiment, however, even though polarized light conversion is being performed, it is difficult for color shift to occur in color light produced by the rotary color filter 190 because a divergent angle of the polarized light beams emitted from the polarized light beam illumination device 100 is restricted. Therefore, it is possible to project and display a color image having a wider range of colors.

Furthermore, since a light-absorbing-type color filter is not used in the time-division-driving-type reflective liquid crystal device 300T of this embodiment, the brightness of the projected image can be considerably increased without necessitating a large-scale cooling device, even if a light source lamp having extremely high optical output is used.

A liquid crystal tunable filter capable of switching transmitted wavelength regions at high speed without using a dynamic part may be used instead of the rotary color filter 190. In such a color-light-producing filter, spectral characteristics also have great incident angle dependency. The polarized light beam illumination device of this embodiment is suitable for such an optical element having great incident angle dependency since it can obtain high optical output by performing polarized light conversion without taking a high illumination angle.

Third Embodiment

Figure 8:
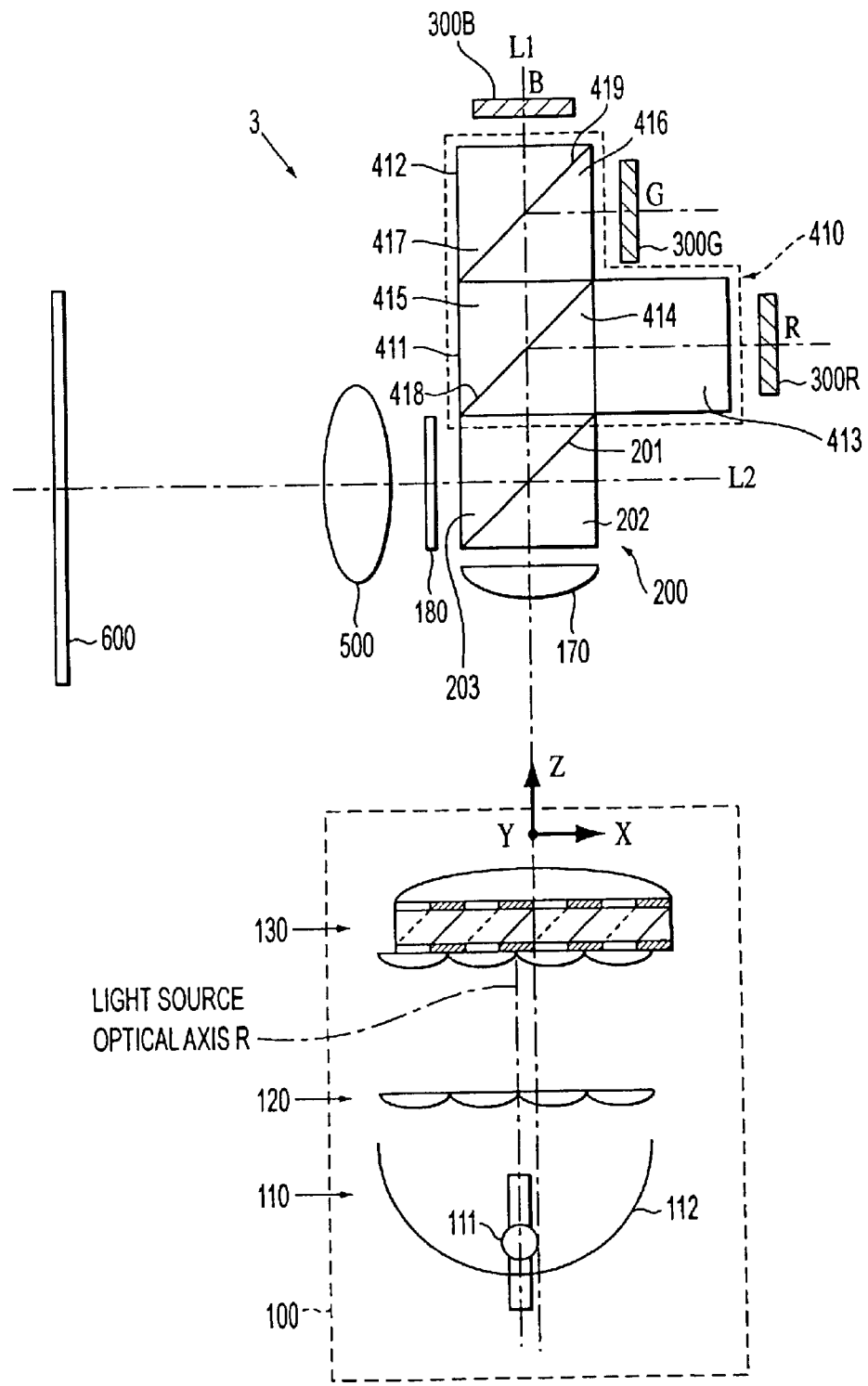
FIG. 8 schematically shows the construction of a principal part of a projector 3 of a third embodiment.

FIG. 8 includes a schematic plan view showing the construction of a principal part of a projector 3 of the third embodiment, and a sectional view in the XZ plane passing through the center of a first optical element 120.

The projector 3 of this embodiment is mainly composed of a polarized light beam illumination device 100 placed along a system optical axis L1, a polarized light beam selection element 200, three reflection-type liquid crystal devices 300R, 300G, and 300B respectively corresponding to red light R, green light G, and blue light B, which perform optical modulation according to external image information (not shown) to produce modulated light beams, an optical color-light-separating-and-synthesizing system 410 placed between the polarized light beam selection element 200 and the three reflection-type liquid crystal devices 300R, 300G, and 300B, for separating a light beam from the polarized light beam illumination device 100 into three types of color light, and for synthesizing each of the color light from the three reflection-type liquid crystal devices 300R, 300G, and 300B in one color light, and a projection optical system 500 placed along a system optical system L2 for projecting light beams modulated by the three reflection-type liquid crystal devices 300R, 300G, and 300B on a projection plane 600. In this embodiment, a collimating lens 170 is also placed on the incident side of the polarized light beam selection element 200, and a polarizer 180 is placed between the polarized light beam selection element 200 and the projection optical system 500, and functions thereof are similar to those of the first embodiment.

In the projector 3 of this embodiment, the polarized light beam illumination device 100 having exactly the same construction as the first embodiment is used. As described in the first embodiment, in the polarized light beam illumination device 100, random polarized light beams emitted from a light source 110 are divided into a plurality of intermediate light beams by the first optical element 120, are converted into one type of polarized light beams (in this embodiment, p-polarized light beams) having a substantially uniform polarization direction, and enter the polarized light beam selection element 200.

The p-polarized light beams incident on the polarized light beam selection element 200 are transmitted by a polarized light beam selection film 201, enters the optical color-light-separating-and-synthesizing system 410, and are separated into red light R, green light G, and blue light B by a first dichroic prism 411 and a second dichroic prism 412.

The first dichroic prism 411 has a red-light-reflecting dichroic film 418, which is made of a dielectric multilayer film or the like, formed on mating faces of two prism parts 414 and 415. Of the p-polarized light beams transmitted by the polarized light beam selection film 201, the red light R is reflected by the red-light-reflecting dichroic film 418, enters the reflection-type liquid crystal device 300R for the red light via a light guide prism 413, and is optically modulated based on external image information (not shown). The light guide prism 413 may be omitted since it is used for equalizing the length of an optical path of the red light R to the length of optical paths of other color lights.

The second dichroic prism 412 has a green-light-reflecting dichroic film 419, which is made of a dielectric multilayer film or the like, formed on mating faces of two prism parts 416 and 417. Of the color light transmitted by the red-light-reflecting dichroic film 418 of the first dichroic prism 411, the green light G is reflected by the green-light-reflecting dichroic film 419, enters the reflection-type liquid crystal device 300G for the green light, and is optically modulated based on external image information (not shown). Furthermore, the blue light B transmitted by the green-light-reflecting dichroic film 419 of the second dichroic prism 412 enters the reflection-type liquid crystal device 300B for the blue light, and is optically modulated based on external image information (not shown).

The red light R, the green light G, and the blue light B modulated by the reflection-type liquid crystal devices 300R, 300G, and 300B are synthesized by the optical color-light-separating-and-synthesizing system 410, are reflected by the polarized light beam selection film 201 of the polarized light beam selection element 200 since they are partially changed to s-polarized light beams, and are projected on the projection plane 600 via the projection optical system 500.

According to the above construction, the projector 3 of this embodiment can also prevent the loss of light to the fullest extent since the opening ratio of the liquid crystal devices is high in a manner similar to the above-described projector 1. Therefore, it is possible to obtain an extremely bright projected image.

Furthermore, the first optical element and the second optical element are used, whereby polarized light beams having uniform brightness can be obtained as illumination light. Therefore, it is possible to obtain an extremely bright projected image without non-uniform brightness or color shading on the entire display plane or projection plane.

Still furthermore, since three sheets of reflection-type liquid crystal devices are used, light absorption per one sheet of reflection-type liquid crystal device is smaller than that of the projectors 1 and 2 of the above-described first and second embodiments. Therefore, even if a light source lamp having extremely high optical output is used, the brightness of the projected image can be considerably increased without necessitating a large-scale cooling device.

In the projector 3 of this embodiment, it is possible to optically incorporate the prism part 202 constituting the polarized light beam selection element 200 and the collimating lens 170. Similarly, it is also possible to constitute the prism part 203 and the prism part 414, the prism part 415 and the prism part 416, and the prism part 414 and the light guide prism 413 as integrated prisms. By integrating these prism parts, the light loss generated at boundaries of the lens and the prism and at boundaries of the prisms can be prevented, light utilizing efficiency is further increased, and a bright projected image can be realized.

For the purpose of complementing separation efficiency of color light in the above optical color-light-separating-and-synthesizing system 410, a color filter for controlling the transmittance of a specific color light can be placed at least one place between the polarized light beam selection element 200 and the three reflection-type liquid crystal devices 300R, 300G, and 300B. Since the polarized light conversion characteristics of the second optical element 130 placed in the polarized light beam illumination device 100 have wavelength dependency, and the color light separating and synthesizing characteristics of the two dichroic prisms 411 and 412 placed in the optical color-light-separating-and-synthesizing element 410 have polarization dependency, color purity of the color light is apt to be influenced by passing through the optical elements. Therefore, the application of the above construction can increase the color purity of the projected image, and the color range is effectively extended.

Furthermore, a dichroic mirror in which a red-light-reflecting dichroic film and a green-light-reflecting dichroic film are formed on a plate-like transparent glass plate may be used instead of the first and second dichroic prisms 411 and 412. The application of the dichroic mirror effectively reduces the weight and cost of the projector 3.

Fourth Embodiment

In the projector 3 of the above described third embodiment, the two dichroic prisms 411 and 412 are used as the optical color-light-separating-and-synthesizing system 410, and the light guide prism 413 is provided on the optical path of the red light in order to equalize the length thereof to the optical paths of other color lights. However, the optical color-light-separating-and-synthesizing system 410 can be constituted by one cross-dichroic prism. An example of such a projector is shown in FIG. 9.

Figure 9:
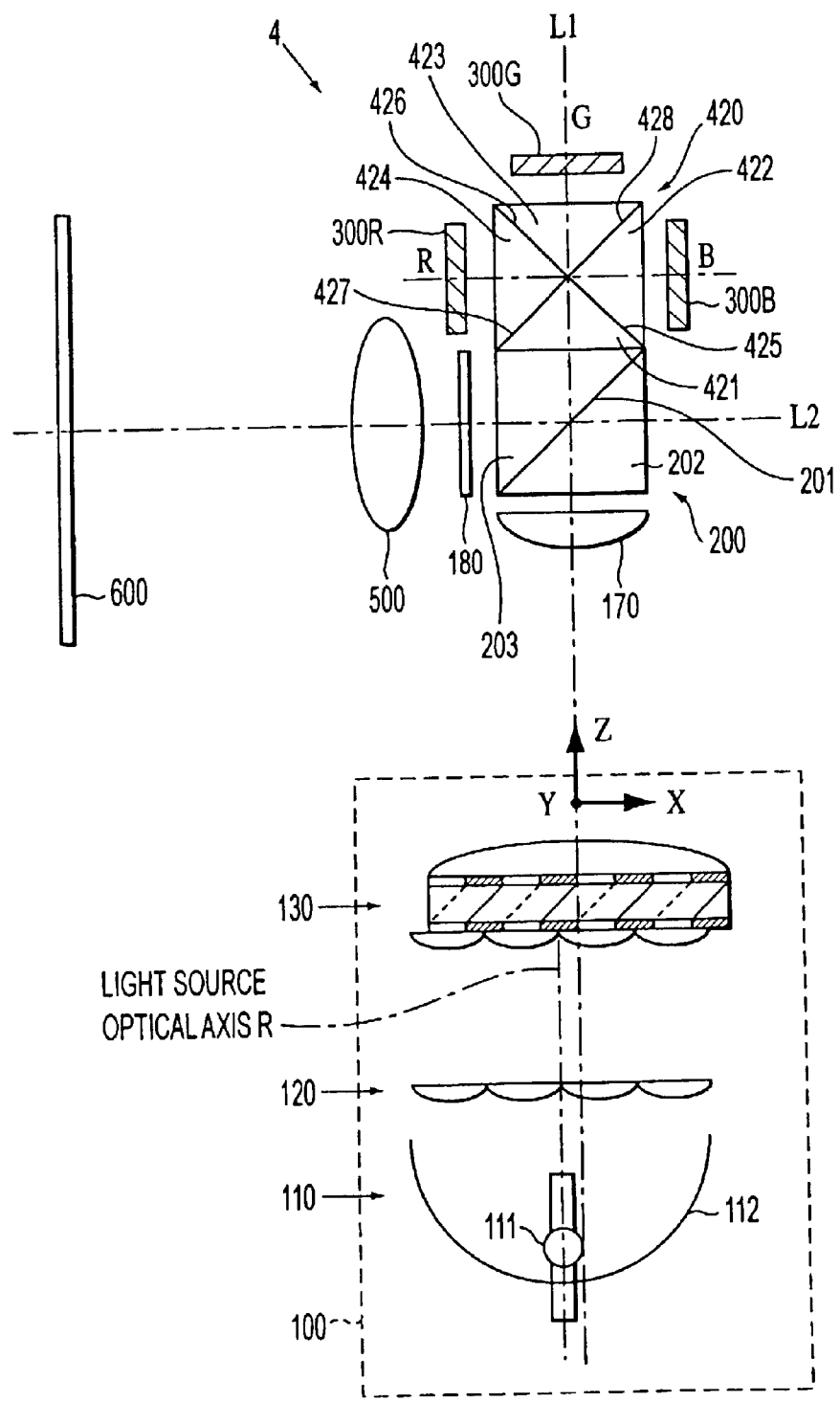
FIG. 9 schematically shows the construction of a principal part of a projector 4 of a fourth embodiment.

FIG. 9 includes a schematic plan view showing the construction of a principal part of a projector 4 of the fourth embodiment, and a sectional view in the XZ plane passing through the center of a first optical element 120. Instead of the first and second dichroic prisms 411 and 412 constituting the optical color-light-separating-and-synthesizing system of the above-described projector 3, the projector 4 of this embodiment uses a cross-dichroic prism 420 in which red-light-reflecting dichroic films 425 and 426 and blue-light-reflecting dichroic films 427 and 428 are arranged in the form of an X between four prism parts 421, 422, 423, and 424. The use of the cross-dichroic prism 420 can extremely shorten the length of an optical path and consequently, an extremely bright projected image can be obtained without using an expensive large-aperture projection lens having a small F-number.

In the projector 4 of this embodiment, it is possible to optically integrate a prism part 202 constituting a polarized light beam selection element 200 and a collimating lens 170. Similarly, it is also possible to integrate a prism part 203 and the prism part 421. With such an integrated construction, the light loss generated at boundaries of the lens and the prism and at boundaries of the prisms can be prevented, light utilizing efficiency is further increased, and a bright projected image can be realized.

Other advantages of the projector 4 of this embodiment are similar to those of the above-described projector 3.

Fifth Embodiment

When the cross-dichroic prism 420 is used as the optical color-light-separating-and-synthesizing system as in the projector 4 of the fourth embodiment, a portion in which dichroic films perpendicularly intersect each other may exist in the center of the prism, and the portion may appear as a shadow on the projected image. If a dichroic prism 430 using a wedge-shaped prism shown in FIG. 10 is employed instead of the cross-dichroic prism 420, this phenomenon can be completely prevented.

Figure 10:
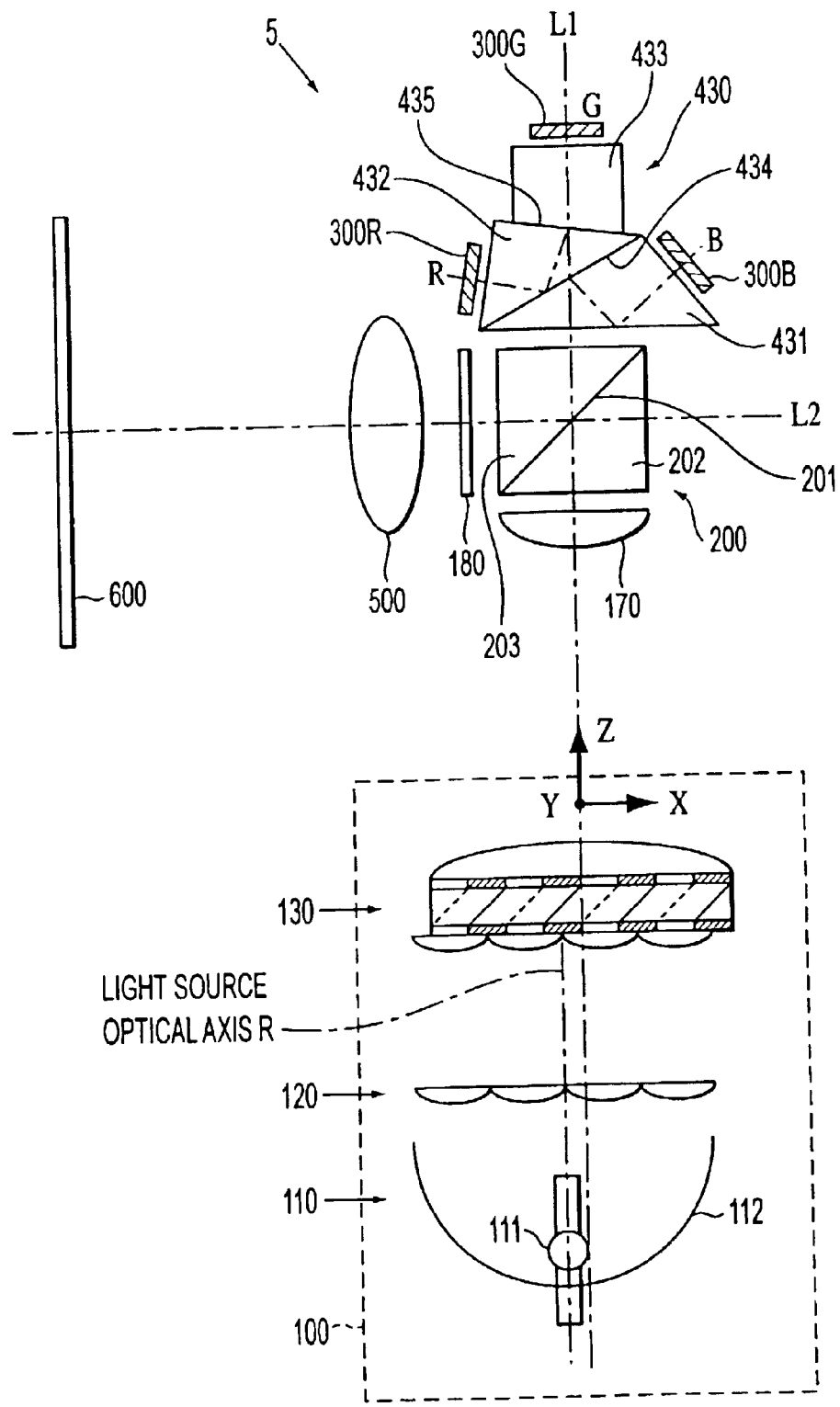
FIG. 10 schematically shows the construction of a principal part of a projector 5 of a fifth embodiment.

FIG. 10 includes a schematic plan view showing the construction of a principal part of a projector 5 of the fifth embodiment, and a sectional view in the XZ plane passing through the center of a first optical element 120. In the projector 5 of this embodiment, the cross-dichroic prism 420 serving as the optical color-light-separating-and-synthesizing system of the projector 4 of the fourth embodiment is replaced with the dichroic prism 430 in which two dichroic films are arranged at different angles with respect to the optical axes thereof.

The dichroic prism 430 is composed of three wedge-shaped prisms 431, 432 and 433 having different shapes in combination. The wedge-shaped prism 431 is formed in the columnar shape having a triangular cross section, and a blue-light-reflecting dichroic film 434 for reflecting blue light and transmitting other color light is formed on a surface thereof adjacent to the wedge-shaped prism 432 to be described hereinbelow. The wedge-shaped prism 432 is also formed in the columnar shape having a triangular cross section, and a red-light-reflecting dichroic film 435 for reflecting red light and transmitting other color light is formed on a plane thereof contacting the wedge-shaped prism 433 to be described hereinbelow. The wedge-shaped prism 433 is formed in substantially a trapezoidal shape in which each side is formed as an oblique line, and is placed by allowing a plane equivalent to an inclined plane to abut against the red-light-reflecting dichroic film 435 of the wedge-shaped prism 432. The wedge-shaped prism 432 is placed while keeping a very small clearance between the wedge-shaped prism 432 and the wedge-shaped prism 431.

As described above, when the dichroic prism 430 having the wedge-shaped prisms is used as the optical color-light-separating-and-synthesizing system, since it does not have a localized cut portion, the portion does not appear as a shadow on the projected image. Since the incident angle of the light incident on the blue-light-reflecting dichroic film 434 or the red-light-reflecting dichroic film 435 can be decreased as compared with the cross-dichroic prism 420, the polarization dependency of the color-light-separating-and-synthesizing characteristics of the dichroic films can be restricted. Therefore, a bright projected image having high color purity and a wider range of colors can be obtained.

Other advantages of the projector 5 of this embodiment are similar to those of the above-described projector 3.

Sixth Embodiment

Figure 11:
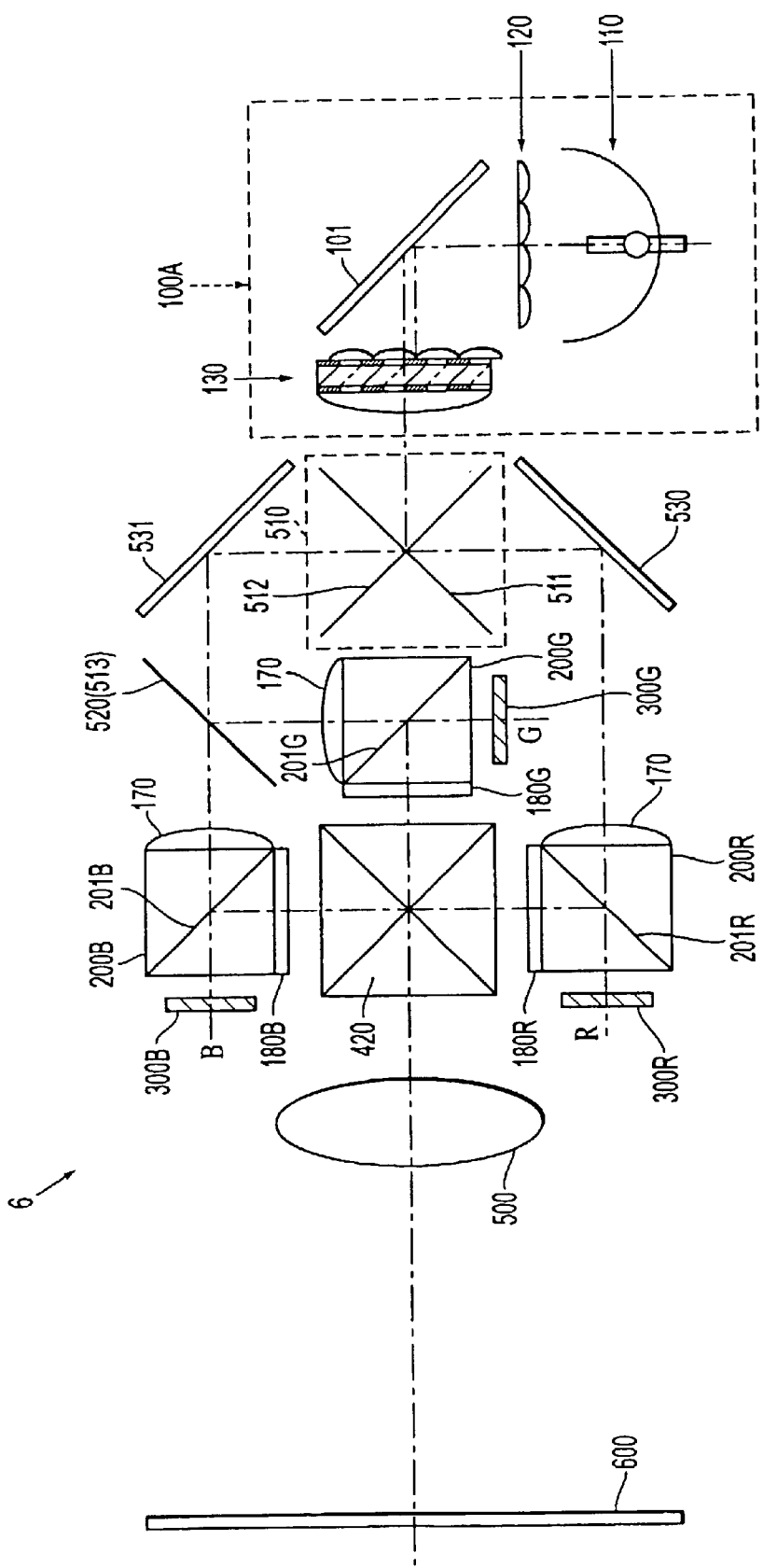
FIG. 11 schematically shows the construction of a principal part of a projector 6 of a sixth embodiment.
Figure 12:
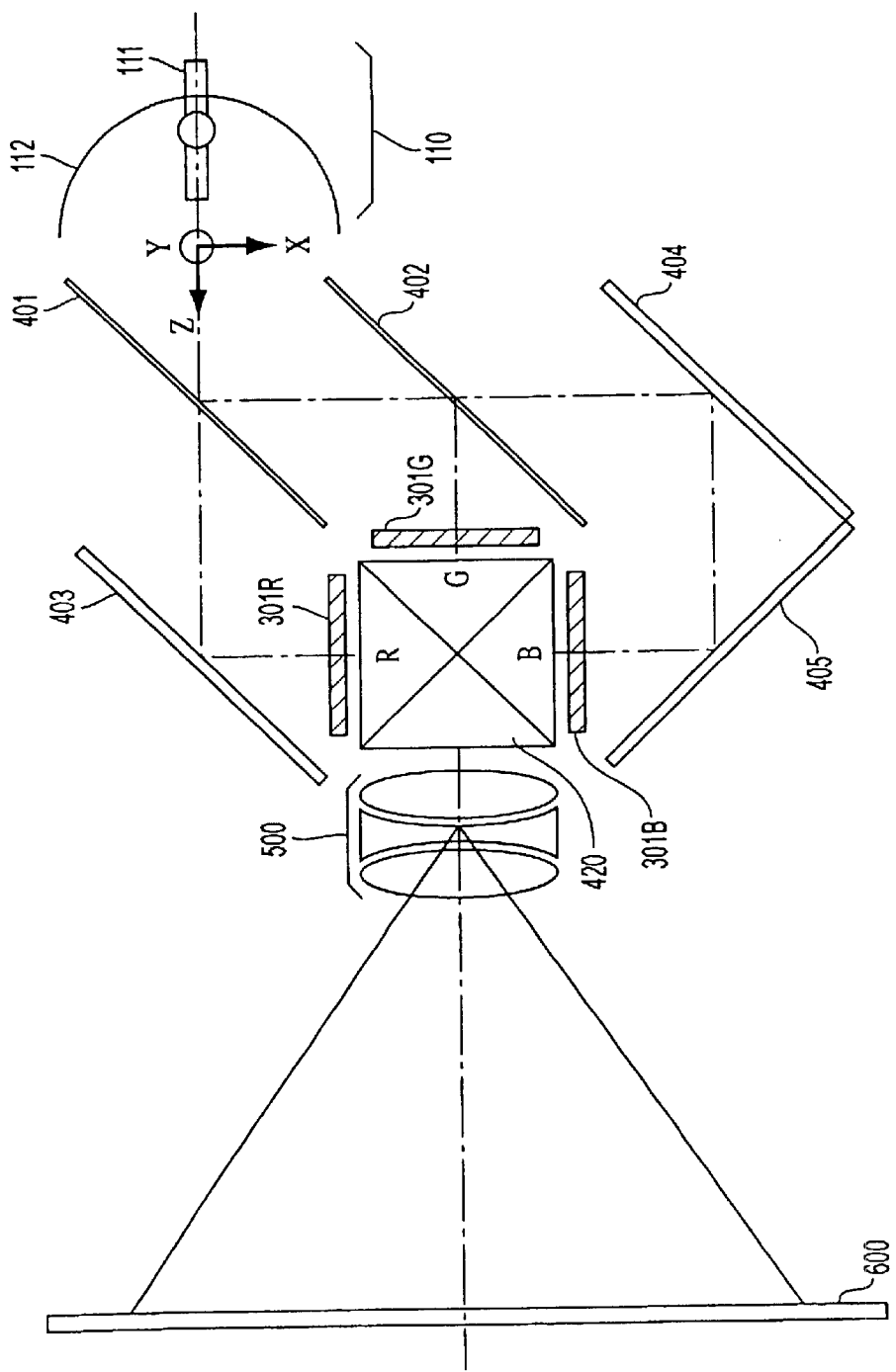
FIG. 12 schematically shows the construction of a principal part of a conventional projector.

FIG. 11 includes a schematic plan view showing the construction of a principal part of a projector 6 of the sixth embodiment, and a sectional view in the XZ plane passing through the center of a first optical element 120. While the color-light-separating-and-synthesizing optical system 410 having both the function of separating and the function of synthesizing color light is used in the projector 3 to 5 of the above-described third to fifth embodiments, the projector 6 of this embodiment differs from the above projectors in that the function of separating the color light and the function of synthesizing the color light are separated, a color-light-separating optical system is placed between a polarized light beam illumination device and a reflection-type liquid crystal device, and a color-light-synthesizing optical system is placed between the reflection-type liquid crystal device and a projection optical device.

A polarized light beam illumination device 100A used in this embodiment is basically the same as the above-described polarized light beam illumination device 100, but a folding mirror 101 is placed between the first optical element 120 and a second optical element 130 to achieve a reduction in the depth of the projector 6. Furthermore, if the function of reflecting only visible light and transmitting infrared rays or ultraviolet rays is given to the folding mirror 101, optical elements subsequent to the folding mirror 101 can be prevented from being deteriorated by the infrared rays or the ultraviolet rays.

Polarized light beams (in this embodiment, p-polarized light beams) emitted from the polarized light beam illumination device 100A enter a first optical color-light-separating system 510 (first color-light-separating element) having red-light-reflecting dichroic mirrors 511 and green and blue-light-reflecting dichroic mirrors 512 arranged in the shape of an X, and are separated into two types of light beams of red light R, and green light G and blue light B. The red light R separated by the first color-light-separating element 510 enters a polarized light beam selection element 200R for the red light, to be described hereinbelow, via a folding mirror 530 and a collimating lens 170. On the other hand, the green light G and the blue light B separated by the first color-light-separating element 510 enter a green-light-reflecting dichroic mirror 513 serving as a second color-light-separating element 520 to be separated into green light G (reflected light) and blue light B (transmitted light), and then enter a polarized light beam selection element 200G for the green light and a polarized light beam selection element 200B for the blue light, to be described hereinbelow, via corresponding collimating lenses 170.

Each of the color light (p-polarized light beams) incident on the three polarized light beam selection elements 200R, 200G, and 200B, which are independently placed for each color light, is optically modulated based on external image information (not shown) so as to change the polarization condition into s-polarized light. Each of the color light changed into an s-polarized light beam including the image information is reflected by the polarized light beam selection films 201R, 201G, and 201B, enters a cross-dichroic prism 420 constituting the color-light-synthesizing optical system, to be synthesized, and is then projected and displayed as a color image on a projection plane 600 via a projection optical system 500. Polarizers 180R, 180G, and 180B are placed between the three polarized light beam selection elements 200R, 200G, and 200B and the cross-dichroic prism 420.

According to the construction as described above, the loss of light can be prevented to the fullest extent since the projector 6 of this embodiment has a large aperture ratio of the liquid crystal device in a manner similar to the above-described projector 1. Therefore, it is possible to obtain an extremely bright projected image.

Furthermore, the first optical element and the second optical element are used, whereby polarized light beams having uniform brightness can be obtained as illumination light. Therefore, it is possible to obtain an extremely bright projected image without non-uniform brightness or color shading on the entire display plane or projection plane.

In general, since the polarized light selecting characteristics of the polarized light beam selection film have great wavelength dependency, it is difficult to realize excellent characteristics across the visible range, and such a polarized light beam selection element is very expensive. In the projector 6 of this embodiment, however, since the three polarized light beam selection elements 200R, 200G, and 200B corresponding to each color light are used, the wavelength ranges for the polarized light beam selection films 201R, 201G, and 201B can be restricted, and both an increase in performance and a cost reduction can be achieved relatively easily. Therefore, it is possible to realize a bright projected image having a wider range of colors as compared with the above-described projectors 3 to 5.

Since the polarizers 180R, 180G, and 180B corresponding to each color light are placed on the emitting side of each of the polarized light beam selection elements 200R, 200G, and 200B, polarization characteristics of the polarizers 180R, 180G, and 180B can be easily increased, whereby a degree of polarization of the light beam incident on the cross-dichroic prism 420 can be further increased, and a projected image having high contrast ratio can be obtained.

In this embodiment, while the polarization conditions of all of the color lights synthesized by the cross-dichroic prism 420 are equally set, a polarization condition of a color light transmitted by the cross-dichroic prism 420 (in this embodiment, green light G) may be set so as to different from that of other color lights. For example, this can be realized by placing a $\lambda/2$ phase plate (not shown) between the polarized light beam selection element 200G and the cross-dichroic prism 420. This construction allows both a cost reduction and color-synthesizing characteristics of the cross-dichroic prism 420 to be achieved, and is effective for increasing the brightness and reducing the cost of the projector 6.

Others

While the p-polarized light beams are obtained in the polarized light beam illumination device in all of the above-described embodiments, s-polarized light beams may be obtained. In this case, the $\lambda/2$ phase layer 148 of the selective phase film 147 may be formed on the p-polarized light-beam emitting surface 145 of the polarized light separation unit array 141.

The projectors include a front type in which a projected image is viewed from the projection plane 600 on the side of the projection optical system 500, and a rear type in which the projected image is viewed from the plane on the opposite side of the projection optical system 500, and the present invention is optical applicable to either of the types.

As described above, according to the projector of the present invention, it is possible to obtain a bright projected image without using a large-aperture projection lens since the length of an optical path can be shortened as compared with a conventional projector. In addition, it is possible to decrease non-uniform illuminance of an area to be illuminated, and it is possible to obtain an extremely uniform and bright projected image on the entire display plane or projection plane. Furthermore, since the reflection-type liquid crystal device of small light absorption is used, brightness of a projected image can be considerably increased without necessitating a large-scale cooling device, even if a light source lamp having extremely high optical output is used.

What is claimed is:

1. A projector comprising:

a light source;

a first optical element that condenses a light beam from said light source and divides the light beam into a plurality of intermediate light beams, the first optical element having a light emitting side;

a second optical element placed on the light-emitting side of said first optical element that converts said plurality of intermediate light beams into one type of polarized light beams and superimposing the polarized light beams on a reflection-type modulation device;

only one reflection-type modulation device that modulates light emitted from said second optical element;

a polarized light beam selection element placed on an optical path between said second optical element and said reflection-type modulation device that reflects or transmits the light emitted from said second optical element to allow the emitted light to reach said reflection-type modulation device, and that transmits or reflects the light modulated by said reflection-type modulation device to allow the modulated light to reach a projection optical system; and a collimating lens placed between said second optical element and said polarized light beam selection element.

2. The projector according to claim 1, further comprising a polarized light conversion element including:

a polarized light separation unit array in which a plurality of polarized light separation units, each having a pair of a separation surface and a reflection surface for polarized light, are aligned; and a selective phase film in which $\lambda/2$ phase layers are regularly formed.

3. The projector according to claim 2, further comprising a light-shielding plate array that prevents the intermediate light beams from directly entering portions of the reflection surfaces placed on an incident side of the polarized light separation unit array.

4. The projector according to claim 1, the one type of polarized light beams emitted from the second optical element being a p-polarized light beam type with respect to the polarized light beam selection element.

5. The projector according to claim 1, further comprising a polarizer provided on an optical path between the polarized light beam selection element and the projection optical system.

6. A projector comprising:

a light source;

a first optical element that condenses a light beam from the light source and divides the light beam into a plurality of intermediate light beams, the first optical element having a light-emitting side;

a second optical element placed on the light-emitting side of the first optical element that converts the plurality of intermediate light beams into one type of polarized light beams and superimposing the polarized light beams a reflection-type modulation device;

three reflection-type modulation devices that modulate color light of three colors;

an optical color-light-separating-and-synthesizing system that separates a light beam emitted from the second optical element into color light of three colors, and synthesizes each color light modulated by the three reflection-type modulation devices;

a polarized light beam selection element placed on an optical path between the second optical element and the optical color-light-separating-and-synthesizing system that reflects or transmits the light emitted from the second optical element to allow the emitted light to reach the optical color-light-separating-and-synthesizing system, and transmits or reflects light synthesized by the optical color-light-separating-and-synthesizing system to allow the light to reach a projection optical system; and a collimating lens placed between the second optical element and the polarized light beam selection element.

7. The projector according to claim 6, further comprising a polarized light conversion element including:

a polarized light separation unit array in which a plurality of polarized light separation units, each having a pair of a separation surface and a reflection surface for polarized light, are aligned; and a selective phase film in which λ/2 phase layers are regularly formed.

8. The projector according to claim 7, further comprising a light-shielding plate array that prevents the intermediate light beams from directly entering the portions of the reflection surfaces placed on an incident side of the polarized light separation unit array.

9. The projector according to claim 6, the one type of polarized light beams emitted from the second optical element being a p-polarized light beam type with respect to the polarized light beam selection element.

10. The projector according to claim 6, further comprising a polarizer provided on an optical path between the polarized light beam selection element and the projection optical system.

11. The projector according to claim 6, the optical color-light-separating-and-synthesizing system including two dichroic prisms.

12. The projector according to claim 6, the optical color-light-separating-and-synthesizing system including one cross-dichroic prism.

13. The projector according to claim 6, the optical color-light-separating-and-synthesizing system including a wedge-shaped dichroic prism.

14. A projector comprising:

a light source;

a first optical element that condenses a light beam from the light source and divides the light beam into a plurality of intermediate light beams, the first optical element having a light-emitting side;

a second optical element placed on the light-emitting side of the first optical element that converts the plurality of intermediate light beams into one type of polarized light beams and superimposing the polarized light beams on a modulation device;

an optical color-light-separating system that separates a light beam emitted from the second optical element into color light of three colors;

three modulation devices that modulate each of the color light separated by the optical color-light-separating system;

an optical color-light-synthesizing system that synthesizes the color light modulated by the three modulation devices;

three polarized light beam selection elements placed on an optical path between the optical color-light-separating system and the optical color-light-synthesizing system that reflects or transmits the light emitted from the optical color-light-separating system to allow the emitted light to reach each of the three modulation devices, and that transmits or reflects the light modulated by the three modulation devices to allow the modulated light to reach the optical color-light-synthesizing system; and three collimating lenses, each placed between the optical color light-separating system and a polarized light beam selection element.

15. The projector according to claim 14, further comprising a polarized light conversion element including:

a polarized light separation unit array in which a plurality of polarized light separation units, each having a pair of a separation surface and a reflection surface for polarized light, are aligned; and a selective phase film in which λ/2 phase layers are regularly formed.

16. The projector according to claim 15, further comprising a light-shielding plate array that prevents the intermediate light beams from directly entering portions of the reflection surfaces placed on an incident side of the polarized light separation unit array.

17. The projector according to claim 14, the one type of polarized light beams emitted from the second optical element being a p-polarized light beam type with respect to at least one polarized light beam selection element.

18. The projector according to claim 14, further comprising a polarizer provided on an optical path between at least one polarized light beam selection element and a projection optical system.

* * * * *